US008532160B2

(12) United States Patent
Nakao et al.

(10) Patent No.: US 8,532,160 B2
(45) Date of Patent: Sep. 10, 2013

(54) RADIO COMMUNICATION DEVICE AND RESPONSE SIGNAL SPREADING METHOD

(71) Applicants: Seigo Nakao, Kanagawa (JP); Daichi Imamura, Kanagawa (JP); Katsuhiko Hiramatsu, Leuven (BE)

(72) Inventors: Seigo Nakao, Kanagawa (JP); Daichi Imamura, Kanagawa (JP); Katsuhiko Hiramatsu, Leuven (BE)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/651,014

(22) Filed: Oct. 12, 2012

(65) Prior Publication Data

US 2013/0034126 A1    Feb. 7, 2013

Related U.S. Application Data

(63) Continuation of application No. 12/679,900, filed as application No. PCT/JP2008/002738 on Sep. 30, 2008.

(30) Foreign Application Priority Data

Oct. 1, 2007 (JP) ................................. 2007-257764

(51) Int. Cl.
*H04B 1/707* (2006.01)

(52) U.S. Cl.
USPC ............................. 375/146; 375/140; 375/260

(58) Field of Classification Search
USPC ......... 375/146, 140, 260, 142, 267; 370/343, 370/335, 329; 455/509
See application file for complete search history.

(56) References Cited

U.S. PATENT DOCUMENTS

| 2008/0075195 | A1* | 3/2008 | Pajukoski et al. | ............. 375/298 |
| 2008/0095106 | A1 | 4/2008 | Malladi et al. | |
| 2008/0298433 | A1 | 12/2008 | Tiirola et al. | |
| 2008/0310540 | A1* | 12/2008 | Tiirola et al. | ................. 375/267 |
| 2009/0046805 | A1* | 2/2009 | Kim et al. | ..................... 375/295 |
| 2010/0034165 | A1 | 2/2010 | Han et al. | |

FOREIGN PATENT DOCUMENTS

| JP | 2010-541308 A | 12/2010 |
| WO | 2009/035297 A2 | 3/2009 |

OTHER PUBLICATIONS

ETRI, "Randomization of intra-cell interference in PUCCH," R1-073412, Agenda Item: 7.2.4 Uplink Control Signaling, 3GPP TSG RAN WG1 Meeting #50, Athens, Greece, Aug. 20-24, 2007, 6 pages.

(Continued)

*Primary Examiner* — Shuwang Liu
*Assistant Examiner* — Helene Tayong
(74) *Attorney, Agent, or Firm* — Seed IP Law Group PLLC

(57) ABSTRACT

A radio communication device capable of randomizing both inter-cell interference and intra-cell interference. In this device, a spreading section primarily spreads a response signal in a ZAC sequence set by a control unit. A spreading section secondarily spreads the primarily spread response signal in a block-wise spreading code sequence set by the control unit. The control unit controls the cyclic shift amount of the ZAC sequence used for the primary spreading in the spreading section and the block-wise spreading code sequence used for the secondary spreading in the spreading section according to a set hopping pattern. The hopping pattern set by the control unit is made up of two hierarchies. An LB-based hopping pattern different for each cell is defined in the first hierarchy in order to randomize the inter-cell interference. A hopping pattern different for each mobile station is defined in the second hierarchy to randomize the intra-cell interference.

12 Claims, 19 Drawing Sheets

(56) References Cited

OTHER PUBLICATIONS

ETRA, "Sequence allocation and hopping for uplink ACK/NAK channels," R1-073413, Agenda Item: 7.2.4 Uplink Control Signaling, 3GPP TSG RAN WG1 Meeting #50, Athens, Greece, Aug. 20-24, 2007, 6 pages.
International Search Report, dated Dec. 16, 2008, for International Application No. PCT/JP2008/002738, 3 pages.
Nokia Siemens Networks, Nokia, "Multiplexing capability of CQIs and ACK/NACKs form different UEs," R1-072315, Agenda Item: 7.13.2, 3GPP TSG RAN WG1 Meeting #49, Kobe, Japan, May 7-11, 2007, 4 pages.
Nokia Siemens Networks, Nokia, "Symbol based cyclic shift hopping," R1-073643, Agenda Item: 7.2.2 Uplink reference signals, 3GPP TSG RAN WG1 Meeting #50, Athens, Greece, Aug. 20-24, 2007, 6 pages.
Notice of the Reasons for Rejection, dated Oct. 25, 2011, for corresponding Japanese Application No. 2009-535969, 5 pages.
NTT DoCoMo, Fujitsu, Mitsubishi Electric, "Implicit Resource Allocation of ACK/NACK Signal in E-UTRA Uplink," R1-072439, Agenda Item: 7.13.2, 3GPP TSG RAN WG1 Meeting #49, Kobe, Japan, May 7-11, 2007, 3 pages.
Panasonic, "Cell Specific Cyclic Shift Hopping v.s. UE specific Cyclic Shift Hopping for Uplink ACK/NACK Signals," R1-073619, Agenda Item: 7.2.4 Uplink Control Channel, 3GPP TSG RAN WG1 Meeting #50, Athens, Greece, Aug. 20-24, 2007, 4 pages.
Panasonic, "Cyclic Shift Hopping Pattern for Uplink ACK/NACK," R1-074411, Agenda Item: 6.2.4 Uplink Control Channel, 3GPP TSG RAN WG1 Meeting #50bis, Shanghai, China, Oct. 8-12, 2007, 6 pages.
Samsung, "Cyclic Shift Hopping of UL ACK Channels," R1-073149, Agenda Item: 5.13.2, 3GPP TSG RAN WG1 Meeting #49bis, Orlando, USA, Jun. 25-29, 2007, 6 pages.
Panasonic, Texas Instruments, "Usage of Cyclic Shifts and block-wise spreading codes for Uplink ACK/NACK," R1-073618, 3GPP TSG RAN WG1 Meeting #50, Agenda Item: 7.2.4 Uplink Control Channel, Athens, Greece, Aug. 20-24, 2007, pp. 1-5.
Panasonic, "Variable Phase Definition of the Reference Signal for CQI in PUCCH," R1-073621, Agenda Item: 7.2.4 Uplink Control Channel, 3GPP TSG RAN WG1 Meeting #50, Athens, Greece, Aug. 20-24, 2007, 5 pages.

* cited by examiner

RADIO COMMUNICATION DEVICE AND RESPONSE SIGNAL SPREADING METHOD

CROSS-REFERENCE TO RELATED APPLICATIONS

This is a continuation of U.S. application Ser. No. 12/679,900, filed Mar. 24, 2010, which is a U.S. national entry application of International Application No. PCT/JP2008/002738, filed Sep. 30, 2008, which claims priority to Japanese Application No. 2007-257764, filed Oct. 1, 2007.

TECHNICAL FIELD

The present invention relates to a radio communication apparatus and response signal spreading method.

BACKGROUND ART

In mobile communication, ARQ (Automatic Repeat reQuest) is applied to downlink data from a radio communication base station apparatus (hereinafter abbreviated to a "base station") to radio communication mobile station apparatuses (hereinafter abbreviated to "mobile stations"). That is, mobile stations feed back response signals representing error detection results of downlink data, to the base station. Mobile stations perform a CRC (Cyclic Redundancy Check) of downlink data, and, if CRC=OK (no error), feed back an ACK (ACKnowledgement), and, if CRC=NG (error present), feed back a NACK (Negative ACKnowledgement), as a response signal to the base station. These response signals are transmitted to the base station using uplink control channels such as PUCCH's (Physical Uplink Control CHannels).

Also, the base station transmits control information for carrying resource allocation results of downlink data, to the mobile stations. This control information is transmitted to the mobile stations using downlink control channels such as L1/L2 CCH's (L1/L2 Control CHannels). Each L1/L2 CCH occupies one or a plurality of CCE's (Control Channel Element), depending on the coding rate of control information. For example, when an L1/L2 CCH for carrying control information of a coding rate of ⅔ occupies one CCE, an L1/L2 CCH for carrying control information of a coding rate of ⅓ occupies two CCE's, an L1/L2 CCH for carrying control information of a coding rate of ⅙ occupies four CCE's, and an L1/L2 CCH for carrying control information of a coding rate of 1/12 occupies eight CCE's. If one L1/L2 CCH occupies a plurality of CCE's, the plurality of CCE's occupied by the L1/L2 CCH are consecutive. The base station generates an L1/L2 CCH per mobile station, allocates a CCE that should be occupied by the L1/L2 CCH depending on the number of CCE's required by control information, maps the control information on physical resources associated with the allocated CCE's and transmits the results.

Also, to use downlink communication resources efficiently without signaling to carry PUCCH's from the base station to the mobile stations for transmitting response signals, studies are underway to associate CCE's and PUCCH's on a one-to-one basis (see Non-Patent Document 1). According to this association, each mobile station can decide the PUCCH to use to transmit a response signal from that mobile station, from the CCE associated with a physical resource on which control information for that mobile station is mapped. Therefore, each mobile station maps a response signal from that mobile station on a physical resource, based on the CCE associated with the physical resource on which control information for that mobile station is mapped. For example, when a CCE associated with a physical resource on which control information for a mobile station is mapped is CCE #0, the mobile station decides that PUCCH #0 associated with CCE #0 is the PUCCH for that mobile station. Also, for example, when CCE's associated with physical resources on which control information for that mobile station is mapped are CCE #0 to CCE #3, the mobile station decides that PUCCH #0 associated with CCE #0 of the minimum number among CCE #0 to CCE #3 is the PUCCH for that mobile station, or, when CCE's associated with physical resources on which control information for that mobile station is mapped are CCE #4 to CCE #7, the mobile station decides that PUCCH #4 associated with CCE #4 of the minimum number among CCE #4 to CCE #7 is the PUCCH for that mobile station.

Also, as shown in FIG. 1, studies are underway to perform code-multiplexing by spreading a plurality of response signals from a plurality of mobile stations using ZAC (Zero Auto Correlation) sequences and Walsh sequences (see Non-Patent Document 2). In FIG. 1, ($W_0$, $W_1$, $W_2$, $W_3$) represent Walsh sequences having a sequence length of 4. As shown in FIG. 1, in a mobile station, first, an ACK or NACK response signal is subject to the first spreading in the frequency domain by a sequence having a characteristic of a ZAC sequence (having a sequence length of 12) in the time domain. Next, the response signal subjected to the first spreading is subject to an IFFT (Inverse Fast Fourier Transform) in association with $W_0$ to $W_3$. The response signal spread in the frequency domain is transformed to a ZAC sequence having a sequence length of 12 in the time domain by this IFFT. Further, the signal subjected to the IFFT is subject to second spreading using Walsh sequences (having a sequence length of 4). That is, one response signal is allocated to each of four SC-FDMA (Single Carrier-Frequency Division Multiple Access) symbols $S_0$ to $S_3$. Similarly, response signals of other mobile stations are spread using ZAC sequences and Walsh sequences. Here, different mobile stations use ZAC sequences of different cyclic shift values in the time domain or different Walsh sequences. In this case, the sequence length of a ZAC sequence in the time domain is 12, so that it is possible to use twelve ZAC sequences of cyclic shift values "0" to "11," generated from the same ZAC sequence. Also, the sequence length of a Walsh sequence is 4, so that it is possible to use four different Walsh sequences. Therefore, in an ideal communication environment, it is possible to code-multiplex maximum 48 (12×4) response signals from mobile stations.

Also, as shown in FIG. 1, studies are underway to code-multiplex a plurality of reference signals (e.g., pilot signals) from a plurality of mobile stations (see Non-Patent Document 2). As shown in FIG. 1, when three reference signal symbols $R_0$, $R_1$ and $R_2$, are generated from a ZAC sequence (having a sequence length of 12), first, the ZAC sequence is subjected to an IFFT in association with orthogonal sequences [$F_0$, $F_1$, $F_2$] having a sequence length of 3 such as a Fourier sequence. By this IFFT, a ZAC sequence having a sequence length of 12 in the time domain is provided. Further, the signal subjected to the IFFT is spread using the orthogonal sequences [$F_0$, $F_1$, $F_2$]. That is, one reference signal (i.e. ZAC sequence) is allocated to each of three symbols $R_0$, $R_1$ and $R_2$. Similarly, other mobile stations allocate one reference signal (i.e., ZAC sequence) to each of three symbols $R_0$, $R_1$ and $R_2$. Here, different mobile stations use ZAC sequences of different cyclic shift values in the time domain or different orthogonal sequences. In this case, the sequence length of a ZAC sequence in the time domain is 12, so that it is possible to use 12 ZAC sequences of cyclic shift values "0" to "11" generated from the same ZAC sequence. Also, the sequence length of an orthogonal sequence is 3, so that it is possible to use three different orthogonal sequences. Therefore, in an ideal communication environment, it is possible to code-multiplex maximum 36 (12×3) response signals from mobile stations.

As a result, as shown in FIG. 1, seven symbols of $S_0$, $S_1$, $R_0$, $R_1$, $R_2$, $S_2$, $S_3$ form one slot.

Here, cross-correlation between ZAC sequences of different cyclic shift values generated from the same ZAC sequence, is virtually zero. Therefore, in an ideal communication environment, a plurality of response signals subjected to spreading and code-multiplexing by ZAC sequences of different cyclic shift values (0 to 11), can be separated in the time domain by correlation processing in the base station, virtually without inter-code interference.

However, due to the influence of, for example, transmission timing difference in mobile stations and multipath delayed waves, a plurality of response signals from a plurality of mobile stations do not always arrive at a base station at the same time. For example, if the transmission timing of a response signal spread by a ZAC sequence of the cyclic shift value "0" is delayed from the correct transmission timing, the correlation peak of the ZAC sequence of the cyclic shift value "0" may appear in the detection window for the ZAC sequence of the cyclic shift value "1." Further, if a response signal spread by the ZAC sequence of the cyclic shift value "0" has a delayed wave, interference leakage due to the delayed wave may appear in the detection window for the ZAC sequence of the cyclic shift value "1." That is, in these cases, the ZAC sequence of the cyclic shift value "1" is interfered by the ZAC sequence of the cyclic shift value "0." Therefore, in these cases, the separation performance degrades between a response signal spread by the ZAC sequence of the cyclic shift value "0" and a response signal spread by the ZAC sequence of the cyclic shift value "1." That is, if ZAC sequences of adjacent cyclic shift values are used, the separation performance of response signals may degrade.

Therefore, up till now, if a plurality of response signals are code-multiplexed by spreading using ZAC sequences, a cyclic shift interval (i.e., a difference of cyclic shift values) is provided between the ZAC sequences such that inter-code interference does not occur between the ZAC sequences. For example, when the cyclic shift interval between ZAC sequences is 2, only six ZAC sequences of cyclic shift values "0," "2," "4," "6," "8" and "10" are used in the first spreading of response signals, among twelve ZAC sequences of cyclic shift values "0" to "11" having a sequence length of 12. Therefore, if Walsh sequences having a sequence length of 4 are used in second spreading of response signals, it is possible to code-multiplex maximum 24 (6×4) response signals from mobile stations.

However, as shown in FIG. 1, the sequence length of orthogonal sequences used to spread reference signals is 3, and therefore only three different orthogonal sequences can be used to spread reference signals. Therefore, when a plurality of response signals are separated using the reference signals shown in FIG. 1, only maximum 18 (6×3) response signals from mobile stations can be code-multiplexed. Therefore, three Walsh sequences among four Walsh sequences having a sequence length of 4 are enough, and therefore one Walsh sequence is not used.

Also, one SC-FDMA symbol shown in FIG. 1 may be referred to as one "LB (Long Block)." Therefore, a spreading code sequence used for spreading in symbol units (i.e., in LB units) is referred to as a "block-wise spreading code sequence."

Also, studies are underway to define 18 PUCCH's shown in FIG. 2. Normally, between mobile stations using different block-wise spreading code sequences, the orthogonality of response signals do not collapse unless those mobile stations move fast. However, between mobile stations using the same block-wise spreading code sequence, especially when there is a large difference of received power between response signals from those mobile stations in a base station, one response signal may be interfered with from another response signal. For example, in FIG. 2, a response signal using PUCCH #3 (cyclic shift value=2) may be interfered with from a response signal using PUCCH #0 (cyclic shift value=0).

To reduce such interference, a technique of cyclic shift hopping is studied (see Non-Patent Document 3). Cyclic shift hopping is the technique of changing the cyclic shift values to allocate to the symbols in FIG. 1, over time, in a random manner. By this means, it is possible to randomize the combinations of response signals to cause interference, and prevent only part of mobile stations from having strong interference continuously. That is, by cyclic shift hopping, it is possible to randomize interference.

Here, interference between response signals can be classified broadly into inter-cell interference which refers to the interference caused between cells and intra-cell interference which refers to the interference caused between mobile stations in one cell. Therefore, interference randomization is classified broadly into inter-cell interference randomization and intra-cell interference randomization.

Non-Patent Document 1: Implicit Resource Allocation of ACK/NACK Signal in E-UTRA Uplink (ftp://ftp.3gpp.org/TSG_RAN/WG1_RL1/TSGR1_49/Docs/R1-072439.zip)

Non-Patent Document 2: Multiplexing capability of CQIs and ACK/NACKs form different UEs (ftp://ftp.3gpp.org/TSG_RAN/WG1_RL1/TSGR1_49/Docs/R1-072315.zip)

Non-Patent Document 3: Randomization of intra-cell interference in PUCCH (ftp://ftp.3gpp.org/TSG_RAN/WG1_RL1/TSGR1_50/Docs/R1-073412.zip)

DISCLOSURE OF INVENTION

Problems to be Solved by the Invention

Here, in inter-cell interference, a response signal of a mobile station in one cell is interfered with from a plurality of response signals using the same cyclic shift value as that of the response signal of that station in another cell, and, consequently, many cyclic shift hopping patterns (hereinafter abbreviated to "hopping patterns") are required to randomize inter-cell interference sufficiently. Therefore, to randomize inter-cell interference sufficiently, it is necessary to perform cyclic shift hopping that changes the cyclic shift value per LB (i.e., per SC-FDMA symbol), that is, it is necessary to perform LB-based cyclic shift hopping (i.e., SC-FDMA symbol-based cyclic shift hopping).

On the other hand, to randomize intra-cell interference, allocation of respective hopping patterns to response signals of all mobile stations in one cell is possible. However, there arises a problem that, with an increase of hopping patterns, the overhead of control signals for carrying hopping patterns between a base station and mobile stations increases. Also, there arises a problem that, when a plurality of mobile stations in the same cell perform LB-based cyclic shift hopping unique to individual mobile stations, the relative relationships between the cyclic shift values of $S_0$, $S_1$, $S_2$ and $S_3$ or $R_0$, $R_1$ and $R_2$ multiplied by block-wise spreading code sequences in the mobile stations, may collapse, and therefore the orthogonality between mobile stations using different block-wise spreading code sequences may collapse. For example, in FIG. 2, although PUCCH #3 should be normally interfered with only from PUCCH #0, due to the collapse of the orthogonality between block-wise spreading code sequences, PUCCH #3 is interfered with not only from PUCCH #0 but also from PUCCH #1 and PUCCH #2.

The above problem can be solved by performing slot-based cyclic shift hopping instead of LB-based cyclic shift hopping, that is, by changing the cyclic shift value on a per slot basis.

However, by performing slot-based cyclic shift hopping instead of LB-based cyclic shift hopping, there arises a new problem that inter-cell interference cannot be randomized sufficiently.

That is, there is a contradiction between a hopping pattern suitable for inter-cell interference randomization and a hopping pattern suitable for intra-cell interference randomization.

It is therefore an object of the present invention to provide a radio communication apparatus and response signal spreading method for randomizing both inter-cell interference and intra-cell interference.

Means for Solving the Problem

The radio communication apparatus of the present invention employs a configuration having: a first spreading section that performs first spreading of a response signal using one of a plurality of first sequences that can be separated from each other because of different cyclic shift values; and a control section that controls the first sequence used in the first spreading section, according to hopping patterns for a plurality of control channels associated with the plurality of first sequences, where the hopping patterns comprise a symbol-based first layer hopping pattern that varies between cells, and a slot-based second layer hopping pattern that varies between radio communication apparatuses.

The response signal spreading method of the present invention includes: a first spreading step of performing first spreading of a response signal using one of a plurality of first sequences that can be separated from each other because of different cyclic shift values; and a control step of controlling the first sequence used in the first spreading step, according to hopping patterns for a plurality of control channels associated with the plurality of first sequences, where the hopping patterns comprise a symbol-based first layer hopping pattern that varies between cells, and a slot-based second layer hopping pattern that varies between radio communication apparatuses.

Advantageous Effect of the Invention

According to the present invention, it is possible to randomize both inter-cell interference and intra-cell interference.

BEST MODE FOR CARRYING OUT THE INVENTION

Embodiments of the present invention will be explained below in detail with reference to the accompanying drawings.

(Embodiment 1)

Figure 3:
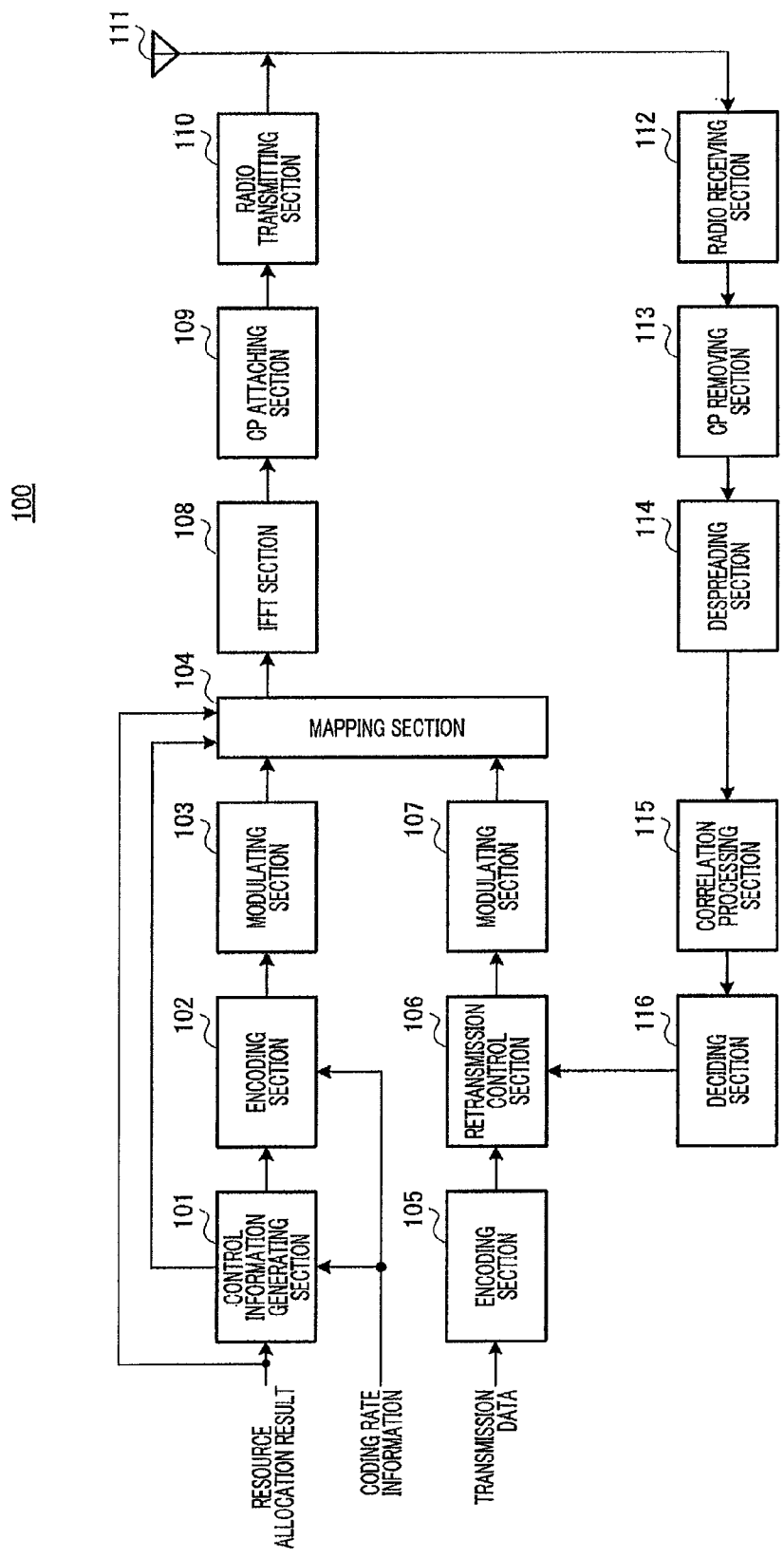
FIG. 3 is a block diagram showing the configuration of a base station according to Embodiment 1 of the present invention.
Figure 4:
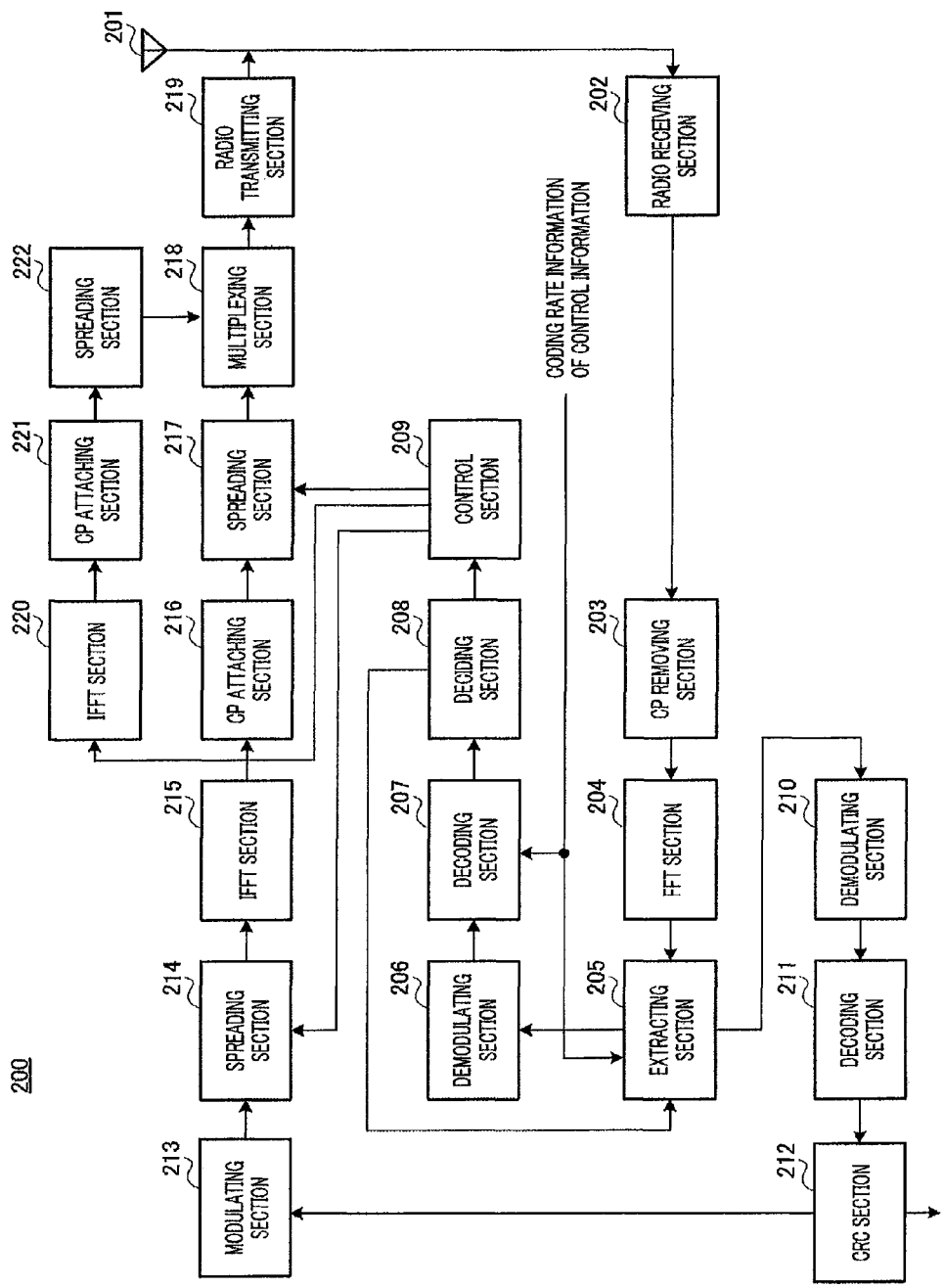
FIG. 4 is a block diagram showing the configuration of a mobile station according to Embodiment 1 of the present invention.

FIG. 3 shows the configuration of base station 100 according to the present embodiment, and FIG. 4 shows the configuration of mobile station 200 according to the present embodiment.

Here, to avoid complicated explanation, FIG. 3 shows components associated with transmission of downlink data and components associated with reception of uplink response signals to downlink data, which are closely related to the present invention, and the illustration and explanation of the components associated with reception of uplink data will be omitted. Similarly, FIG. 4 shows components associated with reception of downlink data and components associated with transmission of uplink response signals to downlink data, which are closely related to the present invention, and the illustration and explanation of the components associated with transmission of uplink data will be omitted.

Also, in the following explanation, a case will be described where ZAC sequences are used in the first spreading and block-wise spreading code sequences are used in second spreading. Here, in the first spreading, it is equally possible to use sequences that can be separated from each other because of different cyclic shift values, other than ZAC sequences. For example, in the first spreading, it is equally possible to use GCL (Generalized Chirp Like) sequences, CAZAC (Constant Amplitude Zero Auto Correlation) sequences, ZC (Zadoff-Chu) sequences, or use PN sequences such as M sequences and orthogonal gold code sequences. Also, in second spreading, as block-wise spreading code sequences, it is possible to use any sequences that can be regarded as orthogonal sequences or substantially orthogonal sequences. For example, in second spreading, it is possible to use Walsh sequences or Fourier sequences as block-wise spreading code sequences.

Also, in the following explanation, twelve ZAC sequences of cyclic shift values "0" to "11" having a sequence length of 12 are expressed as ZAC #0 to ZAC #11, and three block-wise code sequences of sequence numbers "0" to "2" having a sequence length of 4 are expressed as BW #0 to BW #2. However, the present invention is not limited to these sequence lengths.

Also, in the following explanation, the PUCCH numbers are defined by the cyclic shift values of ZAC sequences and the sequence numbers of block-wise spreading code sequences. That is, a plurality of resources for response signals are defined by ZAC #0 to ZAC #11 that can be separated from each other because of different cyclic shift values and BW #0 to BW #2 that are orthogonal to each other.

Also, the following explanation presumes that the CCE numbers and the PUCCH numbers are associated on a one-to-one basis. That is, CCE #0 and PUCCH #0 are associated with each other, CCE #1 and PUCCH #1 are associated with each other, CCE #2 and PUCCH #2 are associated with each other, and so on.

In base station 100 shown in FIG. 3, control information generating section 101 and mapping section 104 receive as input a resource allocation result of downlink data. Also, control information generating section 101 and encoding section 102 receive as input the coding rate of control information per mobile station for carrying a resource allocation result of downlink data, as coding rate information. Here, in the same way as above, the coding rate of control information is one of $2/3$, $1/3$, $1/6$ and $1/12$.

Control information generating section 101 generates control information per mobile station for carrying a resource allocation result, and outputs the control information to encoding section 102. Control information, which is provided per mobile station, includes mobile station ID information to indicate to which mobile station the control information is directed. For example, control information includes, as mobile station ID information, CRC bits masked by the ID number of the mobile station to which that control information is carried. Further, according to the coding rate information received as input, control information generating section 101 performs L1/L2 CCH allocation for each mobile station based on the number of CCE's (i.e., the number of CCE's occupied) required to carry control information, and outputs the CCE number associated with the allocated L1/L2 CCH to mapping section 104. Here, in the same way as above, an L1/L2 CCH occupies one CCE when the coding rate of control information is $2/3$. Therefore, an L1/L2 CCH occupies two CCE's when the coding rate of control information is $1/3$, an L1/L2 CCH occupies four CCE's when the coding rate of control information is $1/6$, and an L1/L2 CCH occupies eight CCE's when the coding rate of control information is $1/12$. Also, in the same way as above, when one L1/L2 CCH occupies a plurality of CCE's, the plurality of CCE's occupied are consecutive.

Encoding section 102 encodes control information on a per mobile station basis according to the coding rate information received as input, and outputs the results to modulating section 103.

Modulating section 103 modulates the encoded control information and outputs the result to mapping section 104.

On the other hand, encoding section 105 encodes and outputs transmission data for each mobile station (i.e., downlink data) to retransmission control section 106.

Upon the initial transmission, retransmission control section 106 holds and outputs encoded transmission data per mobile station to modulating section 107. Retransmission control section 106 holds transmission data until an ACK from each mobile station is received as input from deciding section 116. Also, when a NACK from each mobile station is received as input from deciding section 116, that is, upon retransmission, retransmission control section 106 outputs transmission data associated with that NACK to modulating section 107.

Modulating section 107 modulates the encoded transmission data received as input from retransmission control section 106, and outputs the result to mapping section 104.

Upon transmission of control information, mapping section 104 maps the control information received as input from modulating section 103 on a physical resource based on the CCE number received as input from control information generating section 101, and outputs the result to IFFT section 108. That is, mapping section 104 maps control information on the subcarrier corresponding to the CCE number among a plurality of subcarriers forming an OFDM symbol, on a per mobile station basis.

On the other hand, upon transmission of downlink data, mapping section 104 maps transmission data for each mobile station on a physical resource based on a resource allocation result, and outputs the mapping result to IFFT section 108. That is, based on a resource allocation result, mapping section 104 maps transmission data on part of a plurality of subcarriers forming an OFDM symbol, on a per mobile station basis.

IFFT section 108 generates an OFDM symbol by performing an IFFT of a plurality of subcarriers on which control information or transmission data is mapped, and outputs the OFDM symbol to CP (Cyclic Prefix) attaching section 109.

CP attaching section 109 attaches the same signal as the signal at the tail end part of the OFDM symbol, to the head of that OFDM symbol, as a CP.

Radio transmitting section 110 performs transmission processing such as D/A conversion, amplification and up-conversion on the OFDM symbol with a CP, and transmits the result from antenna 111 to mobile station 200 (in FIG. 3).

On the other hand, radio receiving section 112 receives a response signal or reference signal transmitted from mobile station 200, via antenna 111, and performs receiving processing such as down-conversion and A/D conversion on the response signal or reference signal.

CP removing section 113 removes the CP attached to the response signal or reference signal subjected to receiving processing.

Despreading section 114 despreads the response signal by the block-wise spreading code sequence used in second spreading in mobile station 200, and outputs the despread response signal to correlation processing section 115. Similarly, despreading section 114 despreads the reference signal by the orthogonal sequence that is used to spread a reference signal in mobile station 200, and outputs the despread response signal to correlation processing section 115.

Correlation processing section 115 finds the correlation value between the despread response signal and the ZAC sequence that is used in the first spreading in mobile station 200, and the correlation value between the despread reference signal and that ZAC sequence, and outputs the correlation values to deciding section 116.

Deciding section 116 detects a response signal on a per mobile station basis, by detecting the correlation peaks in the detection windows on a per mobile station basis. For example, upon detecting the correlation peak in detection window #0 for mobile station #0, deciding section 116 detects the response signal from mobile station #0. Further, deciding section 116 decides whether the detected response signal is an ACK or NACK, by synchronization detection using the correlation value of the reference signal, and outputs the ACK or NACK to retransmission control section 106 on a per mobile station basis.

On the other hand, in mobile station 200 shown in FIG. 4, radio receiving section 202 receives an OFDM symbol transmitted from base station 100, via antenna 201, and performs receiving processing such as down-conversion and A/D conversion on the OFDM symbol.

CP removing section 203 removes the CP attached to the OFDM symbol subjected to receiving processing.

FFT (Fast Fourier Transform) section 204 acquires control information or downlink data mapped on a plurality of subcarriers by performing an FFT of the OFDM symbol, and outputs the control information or downlink data to extracting section 205.

Extracting section 205 and decoding section 207 receive as input coding rate information indicating the coding rate of control information, that is, information indicating the number of CCE's occupied by an L1/L2 CCH.

Upon receiving the control information, extracting section 205 extracts the control information from the plurality of subcarriers according to the coding rate information received as input, and outputs the control information to demodulating section 206.

Demodulating section 206 demodulates and outputs the control information to decoding section 207.

Decoding section 207 decodes the control information according to the coding rate information received as input, and outputs the result to deciding section 208.

On the other hand, upon receiving downlink data, extracting section 205 extracts the downlink data directed to the subject mobile station from the plurality of subcarriers, based on the resource allocation result received as input from deciding section 208, and outputs the downlink data to demodulating section 210. This downlink data is demodulated in demodulating section 210, decoded in decoding section 211 and received as input in CRC section 212.

CRC section 212 performs an error detection of the decoded downlink data using a CRC, generates an ACK in the case of CRC=OK (no error) or a NACK in the case of CRC=NG (error present), as a response signal, and outputs the generated response signal to modulating section 213. Further, in the case of CRC=OK (no error), CRC section 212 outputs the decoded downlink data as received data.

Deciding section 208 performs a blind detection of whether or not the control information received as input from decoding section 207 is directed to the subject mobile station. For example, deciding section 208 decides that, if CRC=OK (no error) as a result of demasking CRC bits by the ID number of the subject mobile station, control information is directed to that mobile station. Further, deciding section 208 outputs the control information directed to the subject mobile station, that is, the resource allocation result of downlink data for that mobile station, to extracting section 205.

Further, deciding section 208 decides a PUCCH that is used to transmit a response signal from the subject mobile station, from the CCE number associated with subcarriers on which the control information directed to that mobile station is mapped, and outputs the decision result (i.e., PUCCH number) to control section 209. For example, if a CCE associated with subcarriers on which control information directed to the subject mobile station is CCE #0 as above, deciding section 208 decides that PUCCH #0 associated with CCE #0 is the PUCCH for that mobile station. Also, for example, if CCE's associated with subcarriers on which control information directed to the subject mobile station is mapped are CCE #0 to CCE #3, deciding section 208 decides that PUCCH #0 associated with CCE #0 of the minimum number among CCE #0 to CCE #3 is the PUCCH for that mobile station, and, if CCE's associated with subcarriers on which control information directed to the subject mobile station is mapped are CCE #4 to CCE #7, deciding section 208 decides that PUCCH #4 associated with CCE #4 of the minimum number among CCE #4 to CCE #7 is the PUCCH for that mobile station.

Based on a set hopping pattern and the PUCCH number received as input from deciding section 208, control section 209 controls the cyclic shift value of the ZAC sequence used in the first spreading in spreading section 214 and the block-wise spreading code sequence used in second spreading in spreading section 217. That is, according to a set hopping pattern, control section 209 selects the ZAC sequence of the cyclic shift value associated with the PUCCH number received as input from deciding section 208, among ZAC #0 to ZAC #11, and sets the ZAC sequence in spreading section 214, and selects the block-wise spreading code sequence associated with the PUCCH number received as input from deciding section 208, among BW #0 to BW #2, and sets the block-wise spreading code sequence in spreading section 217. That is, control section 209 selects one of the plurality of resources defined by ZAC #0 to ZAC #11 and BW #0 to BW #2. The sequence control in control section 209 will be described later in detail. Also, control section 209 outputs a ZAC sequence to IFFT section 220 as a reference signal.

Modulating section 213 modulates the response signal received as input from CRC section 212 and outputs the result to spreading section 214.

Spreading section 214 performs first spreading of the response signal by the ZAC sequence set in control section 209, and outputs the response signal subjected to the first spreading to IFFT section 215. That is, spreading section 214 performs first spreading of the response signal using the ZAC sequence of the cyclic shift value associated with the resource selected based on the hopping pattern in control section 209.

IFFT section 215 performs an IFFT of the response signal subjected to the first spreading, and outputs the response signal subjected to an IFFT to CP attaching section 216.

CP attaching section 216 attaches the same signal as the tail end part of the response signal subjected to an IFFT, to the head of that response signal as a CP.

Spreading section 217 performs second spreading of the response signal with a CP by the block-wise spreading code sequence set in control section 209, and outputs the response signal subjected to second spreading to multiplexing section 218. That is, spreading section 217 performs second spreading of the response signal subjected to the first spreading, using the block-wise spreading code sequence associated with the resource selected in control section 209.

IFFT section 220 performs an IFFT of the reference signal and outputs the reference signal subjected to an IFFT to CP attaching section 221.

CP attaching section 221 attaches the same signal as the tail end part of the reference signal subjected to an IFFT, to the head of that reference signal as a CP.

Spreading section 222 spreads the reference signal with a CP by a predetermined orthogonal sequence and outputs the spread reference signal to multiplexing section 218.

Multiplexing section 218 time-multiplexes the response signal subjected to second spreading and the spread reference signal in one slot, and outputs the result to radio transmitting section 219.

Radio transmitting section 219 performs transmission processing such as D/A conversion, amplification and up-conversion on the response signal subjected to second spreading or the spread reference signal, and transmits the result from antenna 201 to base station 100 (in FIG. 3).

Next, sequence control in control section 209 will be explained in detail.

Inter-cell interference randomization presumes the presence of a plurality of mobile stations that interfere with one mobile station, requiring many hopping patterns for inter-cell interference randomization. Therefore, LB-based cyclic shift hopping is suitable for inter-cell interference randomization.

On the other hand, there are only one or two mobile stations that interfere with one mobile station in intra-cell interference, and, consequently, it is sufficient to provide a small number of hopping patterns for intra-cell interference randomization. Also, if LB-based cyclic shift hopping is performed for intra-cell interference, the orthogonality between block-wise spreading code sequences may collapse as above.

Therefore, the present embodiment defines and sets two-layered hopping patterns in control section 209. That is, in the first layer, LB-based hopping patterns that vary between cells are defined for randomizing inter-cell interference. Here, in the first layer, all mobile stations in the same cell use the same hopping pattern. Also, in the second layer, hopping patterns that vary between mobile stations in the same cell are defined for randomizing intra-cell interference. Here, not to collapse the orthogonality between block-wise spreading code sequences, assume that the second layer hopping patterns refer to slot-based hopping patterns. Also, to reduce the signaling amount required to carry the hopping patterns, assume that the second layer hopping patterns refer to the hopping patterns that are common between a plurality of cells.

Thus, each mobile station performs hopping using hopping patterns represented by a first layer hopping pattern and a second layer hopping pattern (i.e., hopping patterns 1+2). That is, hopping patterns 1+2 are set in control section 209, and control section 209 performs sequence control according to the set hopping patterns 1+2.

Also, hopping patterns 1+2 may be carried from a base station to each mobile station. Also, by associating first layer hopping patterns and cell ID's on a one-to-one basis, the signaling amount required to carry first layer hopping patterns may be reduced. Also, as described above, a hopping pattern that is common between a plurality of cells is used as a second layer hopping pattern, and, consequently, by setting second layer hopping patterns uniquely according to the PUCCH numbers in slot 0, the signaling amount required to carry second layer hopping patterns may be reduced.

Sequence control based on hopping patterns 1+2 will be explained below in detail.

EXAMPLE 1-1

FIGS. 5A, 5B, 6A, 6B, 7A and 7B

Figure 5A:
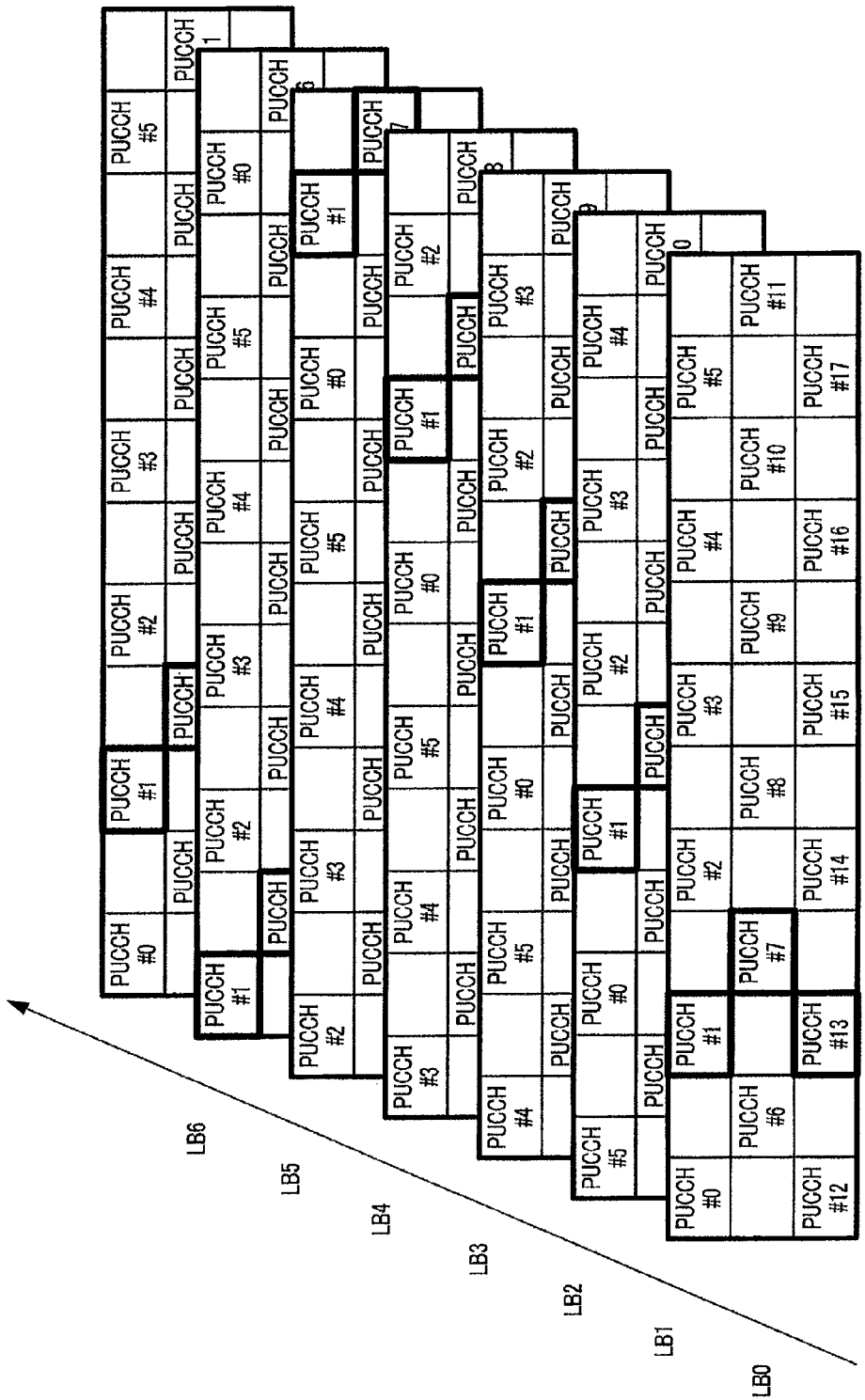
FIG. 5A shows a hopping pattern according to Embodiment 1 of the present invention (slot 0 in cell 0 in example 1-1)
Figure 5B:
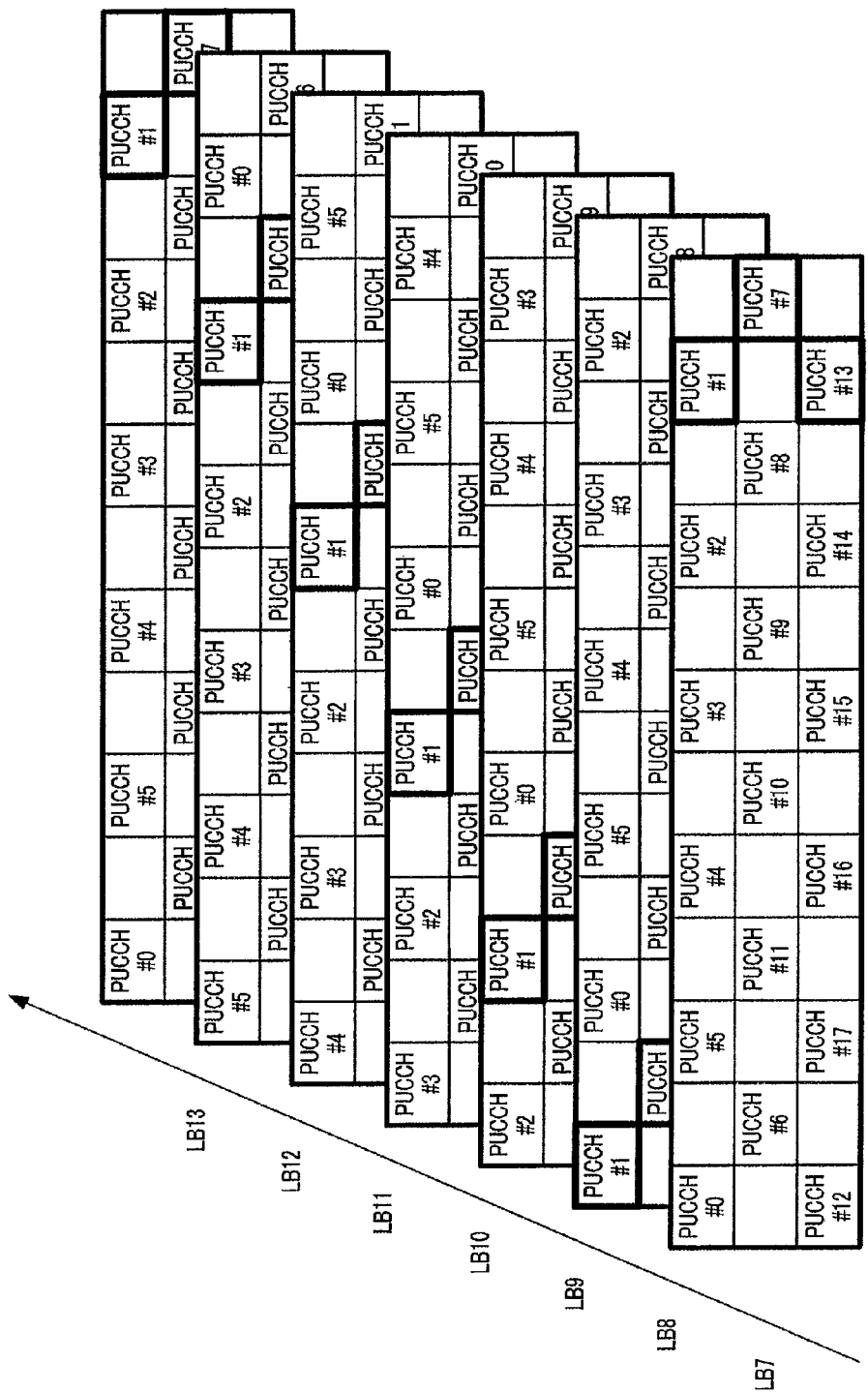
FIG. 5B shows a hopping pattern according to Embodiment 1 of the present invention (slot 1 in cell 0 in example 1-1)
Figure 6A:
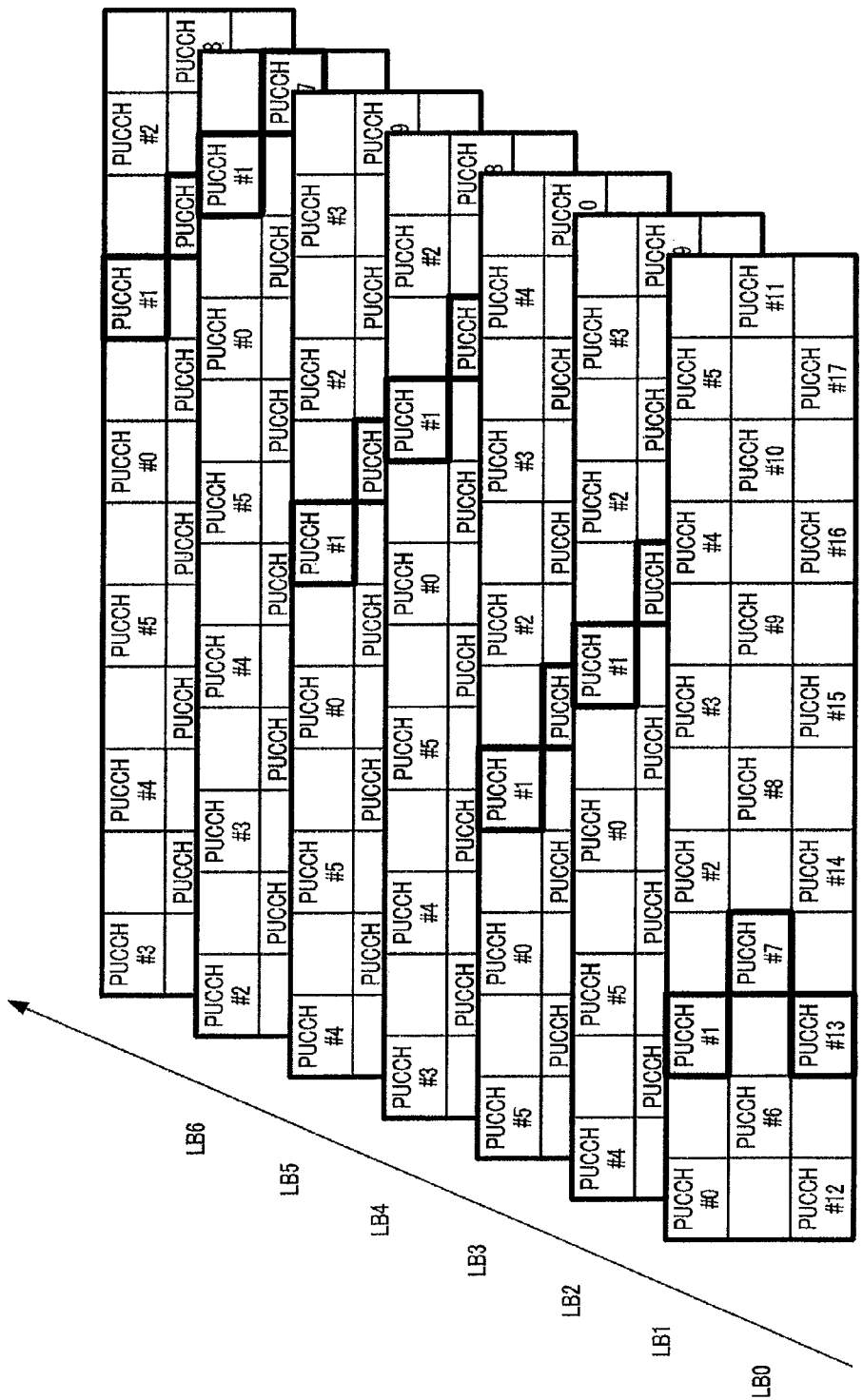
FIG. 6A shows a hopping pattern according to Embodiment 1 of the present invention (slot 0 in cell 1 in example 1-1)
Figure 6B:
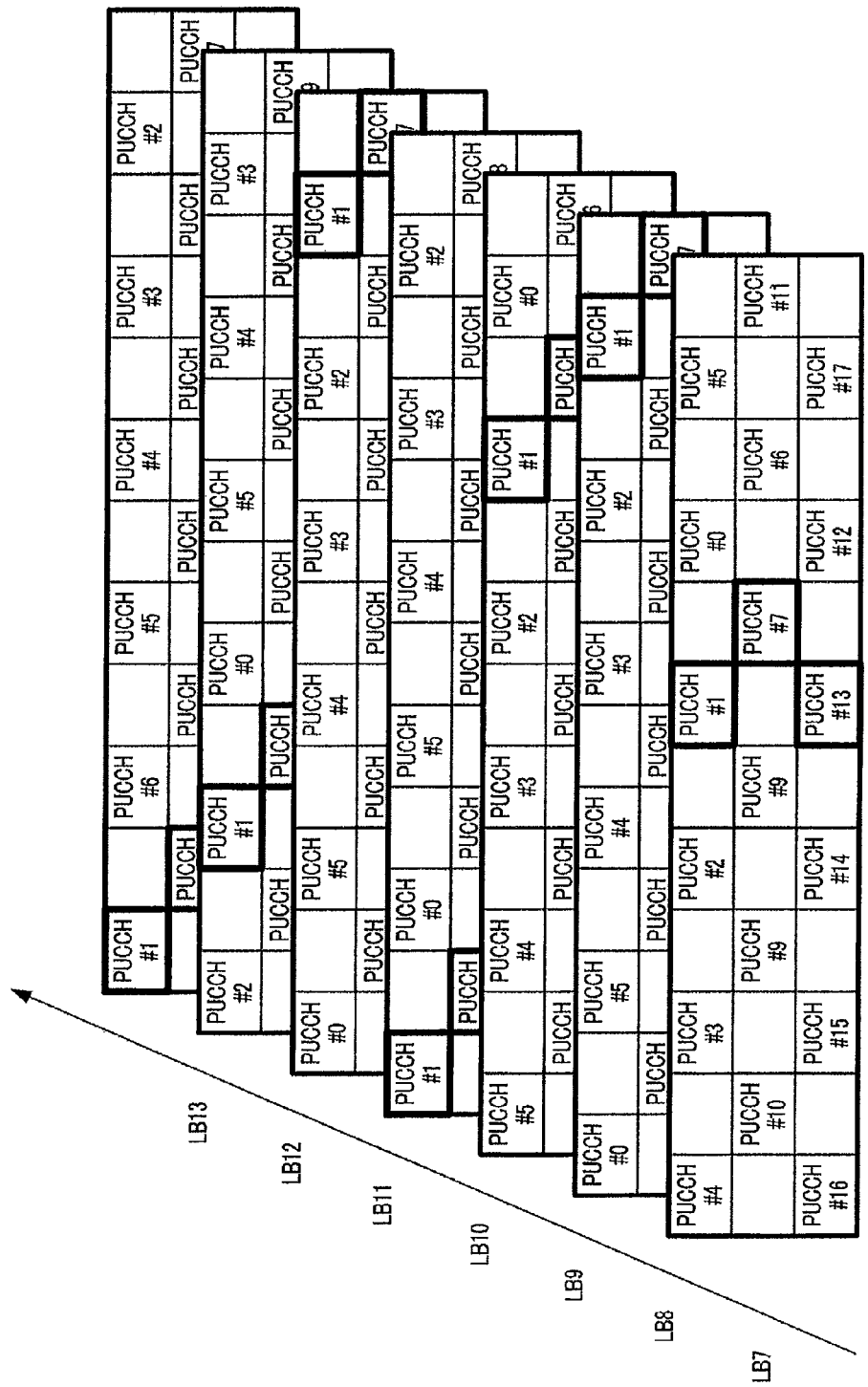
FIG. 6B shows a hopping pattern according to Embodiment 1 of the present invention (slot 1 in cell 1 in example 1-1)

The hopping patterns 1+2 shown in FIGS. 5A and 5B are used in cell 0, and the hopping patterns 1+2 shown in FIGS. 6A and 6B are used in cell 1 adjacent to cell 0.

As shown in FIG. 5A, in slot 0, all PUCCH's of PUCCH #0 to PUCCH #17 keep relative relationships and change the cyclic shift values on a per LB basis, according to the same first layer hopping pattern unique to cell 0. In other words, in slot 0, LB-based hopping unique to cell 0 is performed.

Also, as shown in FIG. 5B, in slot 1 subsequent to slot 0, as in slot 0, LB-based hopping unique to cell 0 is performed according to the first layer hopping pattern unique to cell 0. That is, in each slot in cell 0, LB-based hopping is performed according to the first layer hopping pattern that is common between slots and that is unique to cell 0. However, in slot 1, PUCCH #5 is present in the position in which PUCCH #0 is essentially present, and PUCCH #0 is present in the position in which PUCCH #5 is essentially present. That is, in slot 1, the arrangement order of PUCCH's on the cyclic shift axis is opposite to that in slot 0. For example, referring to BW #0 (first row), while PUCCH's are arranged in order from PUCCH #0, PUCCH #1, PUCCH #2, PUCCH #3, PUCCH #4 to PUCCH #5 in slot 0, PUCCH's are arranged in order from PUCCH #5, PUCCH #4, PUCCH #3, PUCCH #2, PUCCH #1 to PUCCH #0 in slot 1. Thus, in the present example, a slot-based second layer hopping pattern unique to a mobile station is defined by reversing the arrangement order of PUCCH's on the cyclic shift axis on a per slot basis.

Also, in each slot in cell 1, as shown in FIGS. 6A and 6B, LB-based hopping is performed according to the first layer hopping pattern that is common between slots and that is unique to cell 1 different from cell 0. On the other hand, even in cell 1, as shown in FIGS. 6A and 6B, a slot-based second layer hopping pattern unique to a mobile station is defined by reversing the arrangement order of PUCCH's on the cyclic shift axis.

Hopping in the present example is represented by equation 1. That is, the cyclic shift value $CS_{index}(k,i,cell_{id})$ used by the k-th PUCCH in the i-th LB (SC-FDMA symbol) in the cell of the cell index $cell_{id}$, is given by equation 1. Here, init(k) is the cyclic shift value used by the k-th PUCCH in LB0 (first LB). Also, $Hop_{LB}(i,cell_{id})$ is a cell-specific, LB-based hopping pattern that is set for randomizing inter-cell interference and that is common between all mobile stations in the same cell. Also, $Hop_{slot}(k,j)$ is a PUCCH-specific, slot-based hopping pattern that is set for randomizing intra-cell interference and that is common between all cells.

$$CS_{index}(k,i,cell_{id})=\mod(init(k)+Hop_{LB}(i,cell_{id})+Hop_{slot}(k,j),12) \quad \text{(Equation 1)}$$

Figure 2:
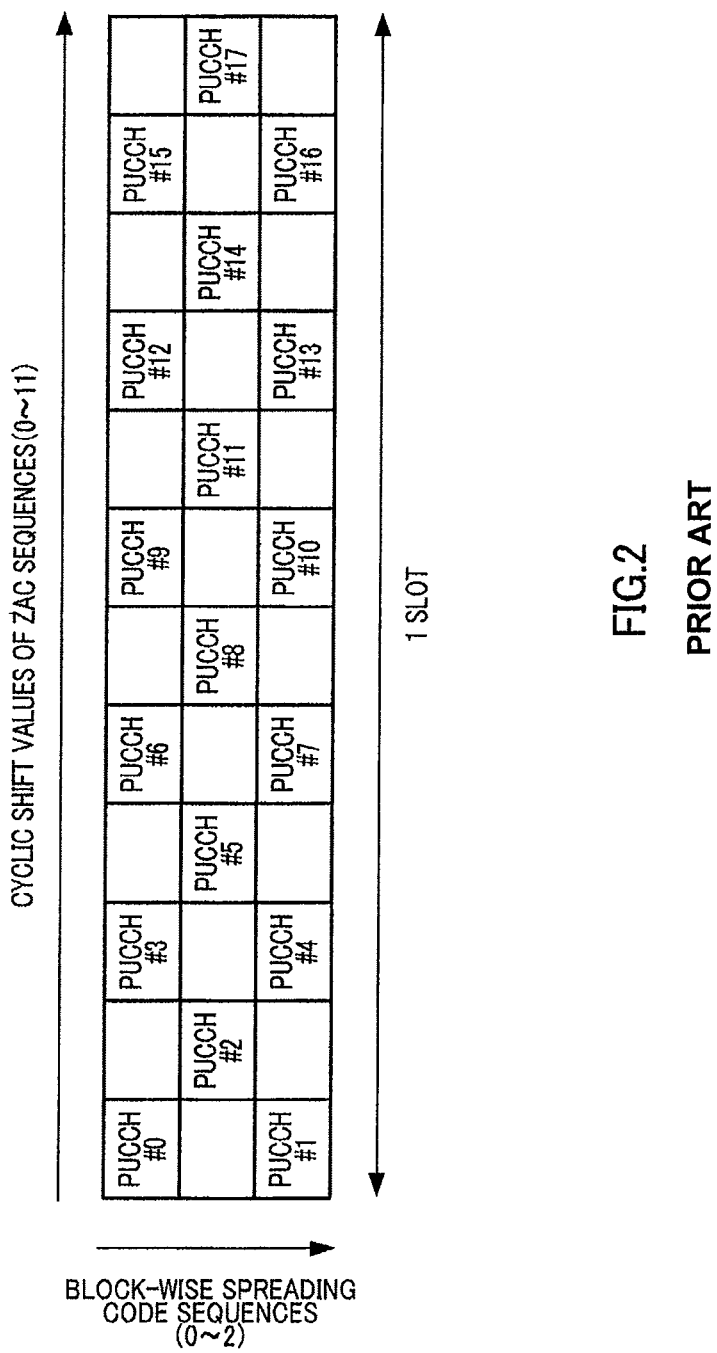
FIG. 2 shows the definition of PUCCH's (prior art)

Here, when one slot is formed with 7 LB's, the relationship shown in FIG. 2 holds between i and j. In this case, floor(x) represents the maximum integer equal to or less than x.

$$j=\text{floor}(i/7) \quad \text{(Equation 2)}$$

Therefore, in FIGS. 5A and 5B, $Hop_{LB}(i,cell_{id})$ is defined by equation 3, and $Hop_{slot}(k,j)$ is defined by one of equations 4, 5 and 6.

$$Hop_{LB}(i,cell_{id})=2i \quad \text{(Equation 3)}$$

$$Hop_{slot}(k,j)=0 \text{ (for } j=0\text{)} \quad \text{(Equation 4)}$$

$$Hop_{slot}(k,j)=10\text{-}init(k) \text{ (for } j=1\text{)} \quad \text{(Equation 5)}$$

$$Hop_{slot}(k,j)=12\text{-}init(k) \text{ (for } j=1\text{)} \quad \text{(Equation 6)}$$

Figure 7A:
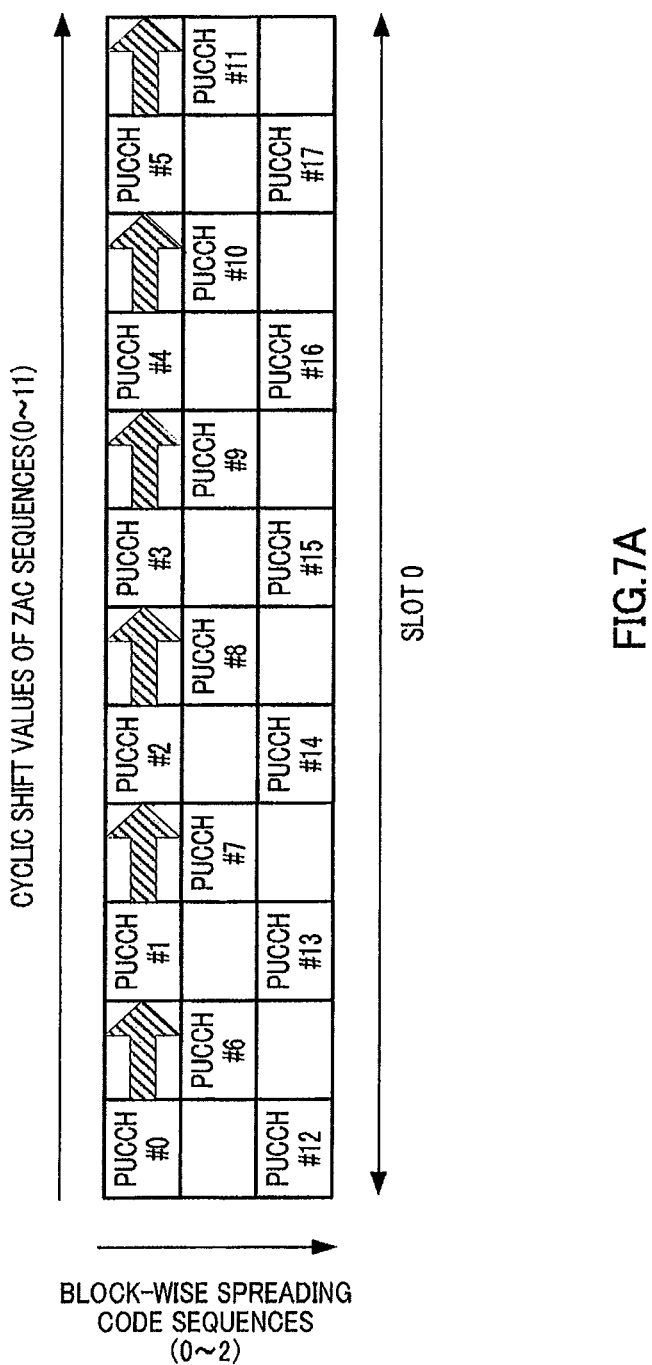
FIG. 7A shows a second layer hopping pattern according to Embodiment 1 of the present invention (slot 0 in example 1-1)
Figure 7B:
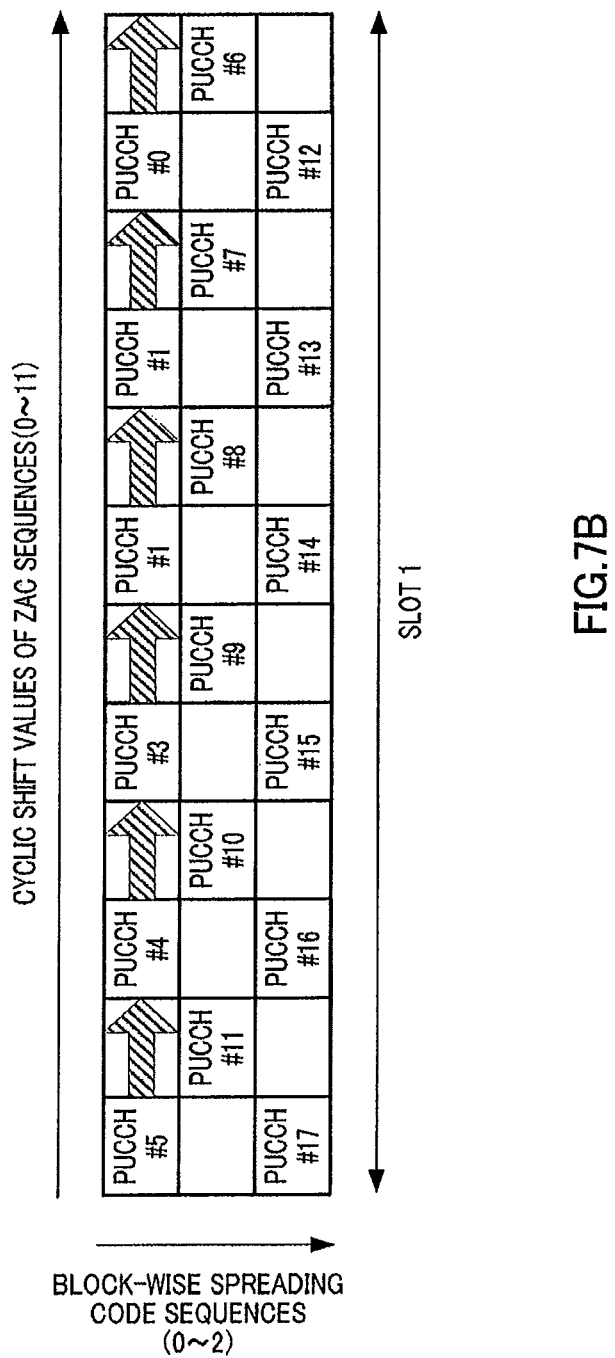
FIG. 7B shows a second layer hopping pattern according to Embodiment 1 of the present invention (slot 1 in example 1-1)

Here, FIGS. 7A and 7B show second layer hopping patterns (i.e., slot-based hopping patterns) common between cell 0 and cell 1. FIGS. 7A and 7B show second layer hopping patterns extracted from FIGS. 5A, 5B, 6A and 6B. From FIGS. 7A and 7B, it is understood that a second layer hopping pattern (i.e., slot-based hopping pattern) is a hopping pattern that is common between cell 0 and cell 1. Also, the arrow direction (i.e., the right direction) in FIGS. 7A and 7B indicates the direction in which interference is likely to occur. From FIGS. 7A and 7B, it is understood that PUCCH's that are likely to be interference sources among all PUCCH's from PUCCH #0 to PUCCH #17 vary between slot 0 and slot 1. For example, while PUCCH #1 is subject to interference from PUCCH #0 in slot 0, PUCCH #1 is subject to interference from PUCCH #3 in slot 1. That is, according to the present example, by simple slot-based hopping patterns defined by reversing the arrangement order of PUCCH's on the cyclic shift axis on a per slot basis, it is possible to randomize intra-cell interference.

Thus, according to the present example, it is possible to maintain the orthogonality between block-wise spreading code sequences, and randomize both inter-cell interference and intra-cell interference. Also, first layer hopping patterns are common between all mobile stations in the same cell, so that it is possible to carry first layer hopping patterns collectively from a base station to all mobile stations in that cell. For example, a base station may carry first layer hopping patterns to mobile stations using BCH's (Broadcast CHannels). Also, by associating cell ID's (i.e., cell indices) and first layer hopping patterns and carrying the cell ID (cell index) of the subject cell to mobile stations, a base station may carry first layer hopping patterns to the mobile stations. Also, according to the present example, a hopping pattern that varies between mobile stations refers to a slot-based hopping pattern, so that it is possible to reduce the number of hopping patterns and reduce the signaling amount required to carry hopping patterns. Also, a second layer hopping pattern refers to a hopping pattern that is common between a plurality of cells, so that it is possible to further reduce the signaling amount required to carry second layer hopping patterns.

EXAMPLE 1-2

Figure 8A:
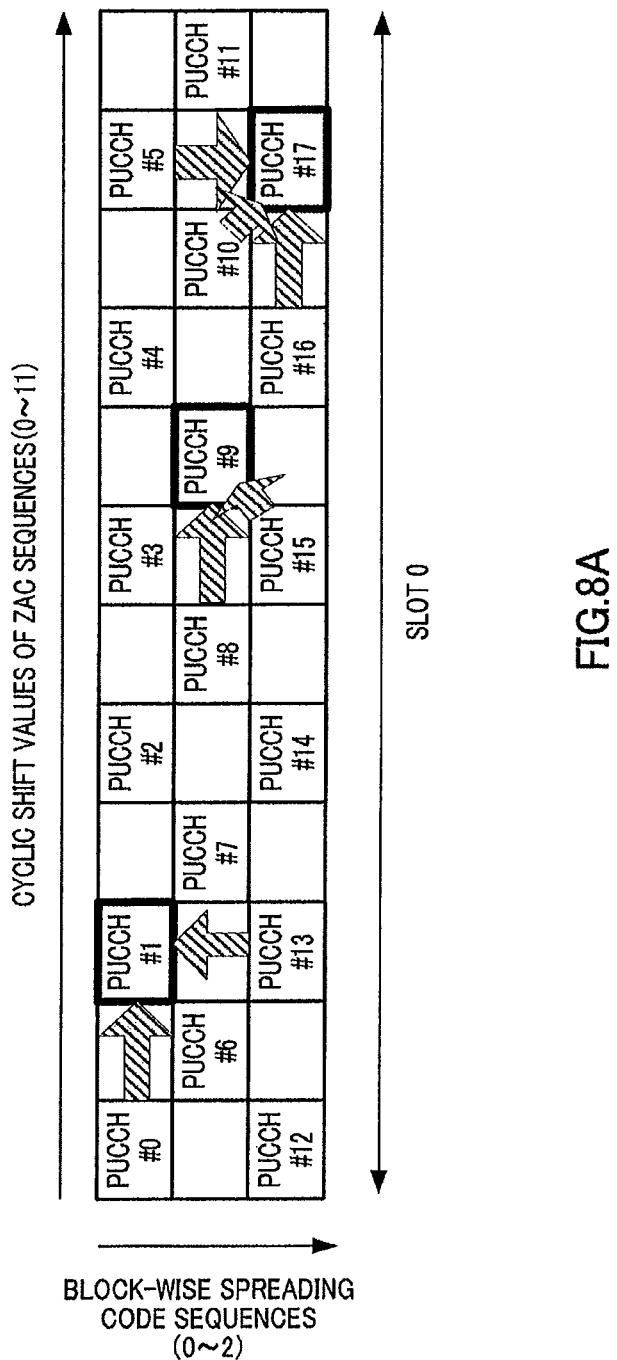
FIG. 8A shows a second layer hopping pattern according to Embodiment 1 of the present invention (slot 0 in example 1-2)
Figure 8B:
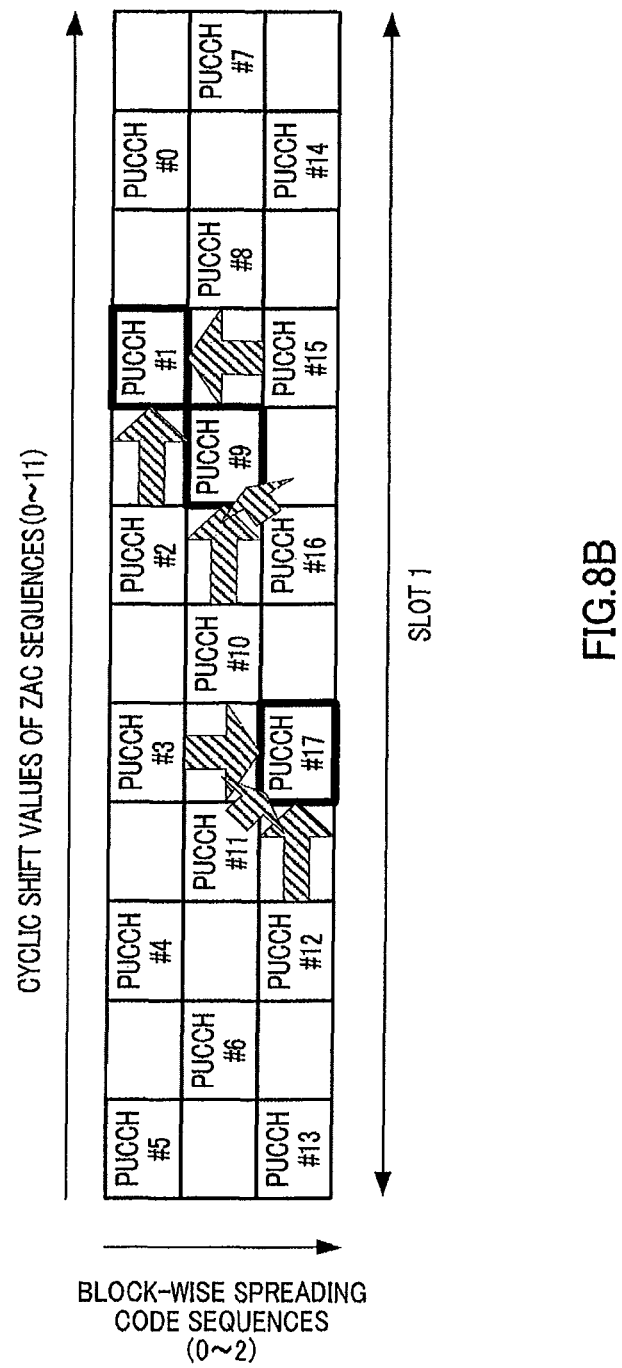
FIG. 8B shows a second layer hopping pattern according to Embodiment 1 of the present invention (slot 1 in example 1-2)

FIGS. 8A and 8B

When mobile stations move fast, interference occurs not only in the arrow direction shown in FIGS. 7A and 7B (i.e., the right direction) but also in the arrow direction shown in FIG. 8A (i.e., vertical directions). This is because, up to now, BW #0=(1, 1, 1, 1), BW #1=(1, −1, 1, −1), and BW #2=(1, −1, −1, 1) are defined, and therefore the orthogonality between BW #1 and BW #2 is more likely to collapse than the orthogonality between BW #0 and BW #1. This is because BW #0 and BW #1 are orthogonal to each other between $W_0$ and $W_1$ and between $W_2$ and $W_3$, and, consequently, if the channel condition is regarded as substantially the same between the first LB and the second LB ($S_0$ and $S_1$) and between the sixth LB and the seventh LB ($S_2$ and $S_3$), interference is not likely to occur between the response signal of BW #0 and the response signal of BW #1, while, if the channel condition is regarded as substantially the same over the first LB to the seventh LB ($S_0$ to $S_3$), interference occurs between the response signal of BW #1 and the response signal of BW #2. Therefore, in FIG. 8A, although interference occurs from PUCCH #15 to PUCCH #9, interference does not occur from PUCCH #6 to PUCCH #1. Interference in the vertical directions shown in FIG. 8A cannot be randomized only by the hopping patterns shown in FIGS. 7A and 7B.

Therefore, in the present example, the hopping patterns shown in FIGS. 8A and 8B are used as second layer hopping patterns. In FIG. 8B, the arrangement order of PUCCH's on the cyclic shift axis is opposite to that in FIG. 8A, and different offsets on the cyclic shift axis are given to PUCCH's associated with respective block-wise spreading code sequences.

Hopping in the present example is represented by equation 7. That is, the cyclic shift value $CS_{index}(k,i,cell_{id})$ in the present example is given by equation 7. Here, w represents a block-wise spreading code sequence index, and $Hop_{offset}(w,j)$ represents the offset value that varies per slot and per block-wise spreading code sequence on the cyclic shift axis.

$$CS_{index}(k,i,w,cell_{id})=\mod(init(k)+Hop_{LB}(i,cell_{id})+Hop_{slot}(k,j)+Hop_{offset}(w,j), 12) \quad \text{(Equation 7)}$$

Thus, according to the present example, it is possible to randomize not only interference that occurs in the cyclic shift axis direction but also interference that occurs in the block-wise spreading code sequence axis direction.

EXAMPLE 1-3

FIG. 8C

Figure 8C:
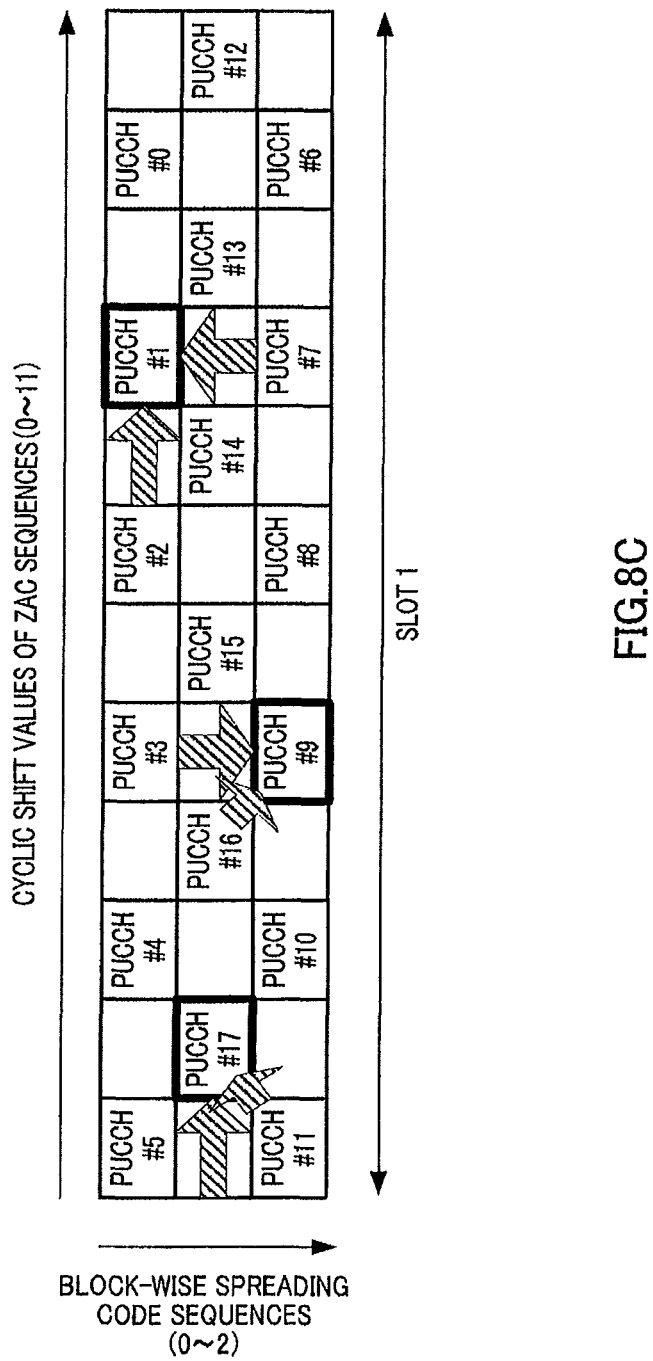
FIG. 8C shows a second layer hopping pattern according to Embodiment 1 of the present invention (slot 1 in example 1-3)

Even by using the hopping pattern shown in FIG. 8C instead of the hopping pattern shown in FIG. 8B, it is possible to provide the same effect as in example 1-2. In FIG. 8C, the arrangement order of PUCCH's on the cyclic shift axis is opposite to that in FIG. 8A, and the PUCCH's associated with BW #1 (a second row) in FIG. 8A are associated with BW #2 (a third row), and the PUCCH's associated with BW #2 (a third row) in FIG. 8A are associated with BW #1 (a second row). That is, FIG. 8C replaces BW #1 (a second row) and BW #2 (a third row) in FIG. 8A with each other.

EXAMPLE 1-4

Figure 9A:
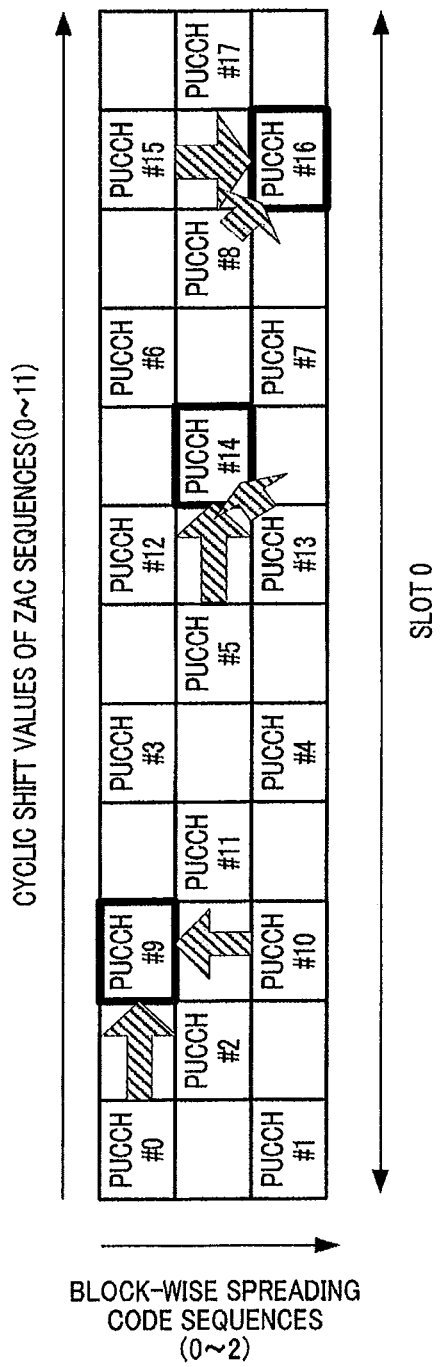
FIG. 9A shows a second layer hopping pattern according to Embodiment 1 of the present invention (slot 0 in example 1-4)
Figure 9B:
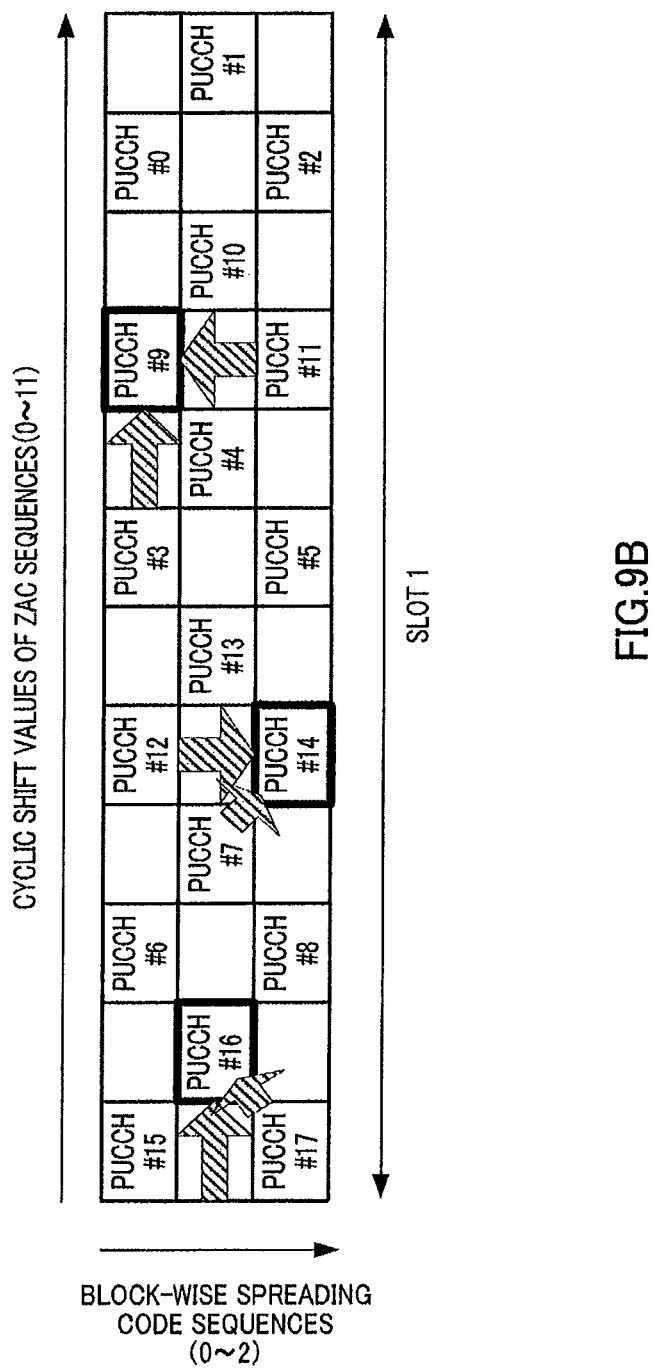
FIG. 9B shows a second layer hopping pattern according to Embodiment 1 of the present invention (slot 1 in example 1-4)

FIGS. 9A and 9B

Even by using the hopping patterns shown in FIGS. 9A and 9B instead of the hopping patterns shown in FIGS. 8A and 8B, it is possible to provide the same effect as in example 1-2. In FIG. 9B, the arrangement order of PUCCH's on the cyclic shift axis is opposite to that in FIG. 9A, and the PUCCH's associated with BW #1 (a second row) in FIG. 9A are associated with BW #2 (a third row), and the PUCCH's associated with BW #2 (a third row) in FIG. 9A are associated with BW #1 (a second row). That is, FIG. 9B replaces BW #1 (a second row) and BW #2 (a third row) in FIG. 9A with each other.

In example 1-2, PUCCH's using substantially the same cyclic shift values in slot 0 (e.g., PUCCH #0, PUCCH #6 and PUCCH #12 in FIG. 8A) use completely different cyclic shift values in slot 1 (FIG. 8B).

By contrast with this, in the present example, as shown in FIGS. 9A and 9B, PUCCH's using substantially the same cyclic shift values in slot 0 (e.g., PUCCH #0, PUCCH #1 and PUCCH #2 in FIG. 9A) also use substantially the same cyclic shift values in slot 1 (FIG. 9B). That is, PUCCH #0, PUCCH #1 and PUCCH #2 use two adjacent cyclic shift values of cyclic shift values "0" and "1" in slot 0 (FIG. 9A), and also use two adjacent cyclic shift values of cyclic shift values "10" and "11" in slot 1 (FIG. 9B). Therefore, when PUCCH #0, PUCCH #1 and PUCCH #2 are unused, unused resources (i.e., available resources) are subject to block-based hopping in both slot 0 and slot 1. Therefore, according to the present example, it is easily possible to allocate unused resources for other purposes such as CQI (Channel Quality Indicator) transmission.

(Embodiment 2)

Figure 10A:
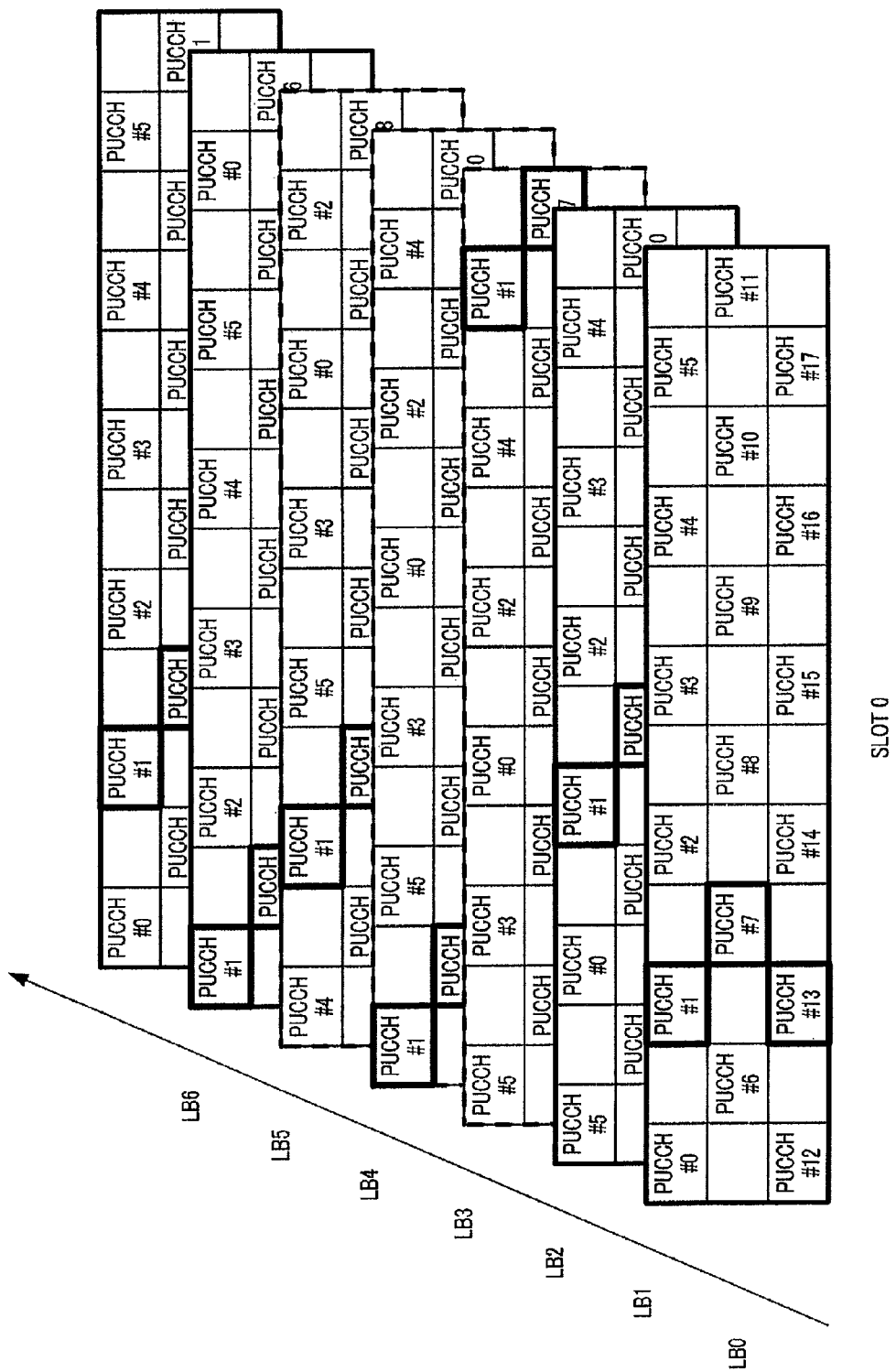
FIG. 10A shows a second layer hopping pattern according to Embodiment 2 of the present invention (slot 0)
Figure 10B:
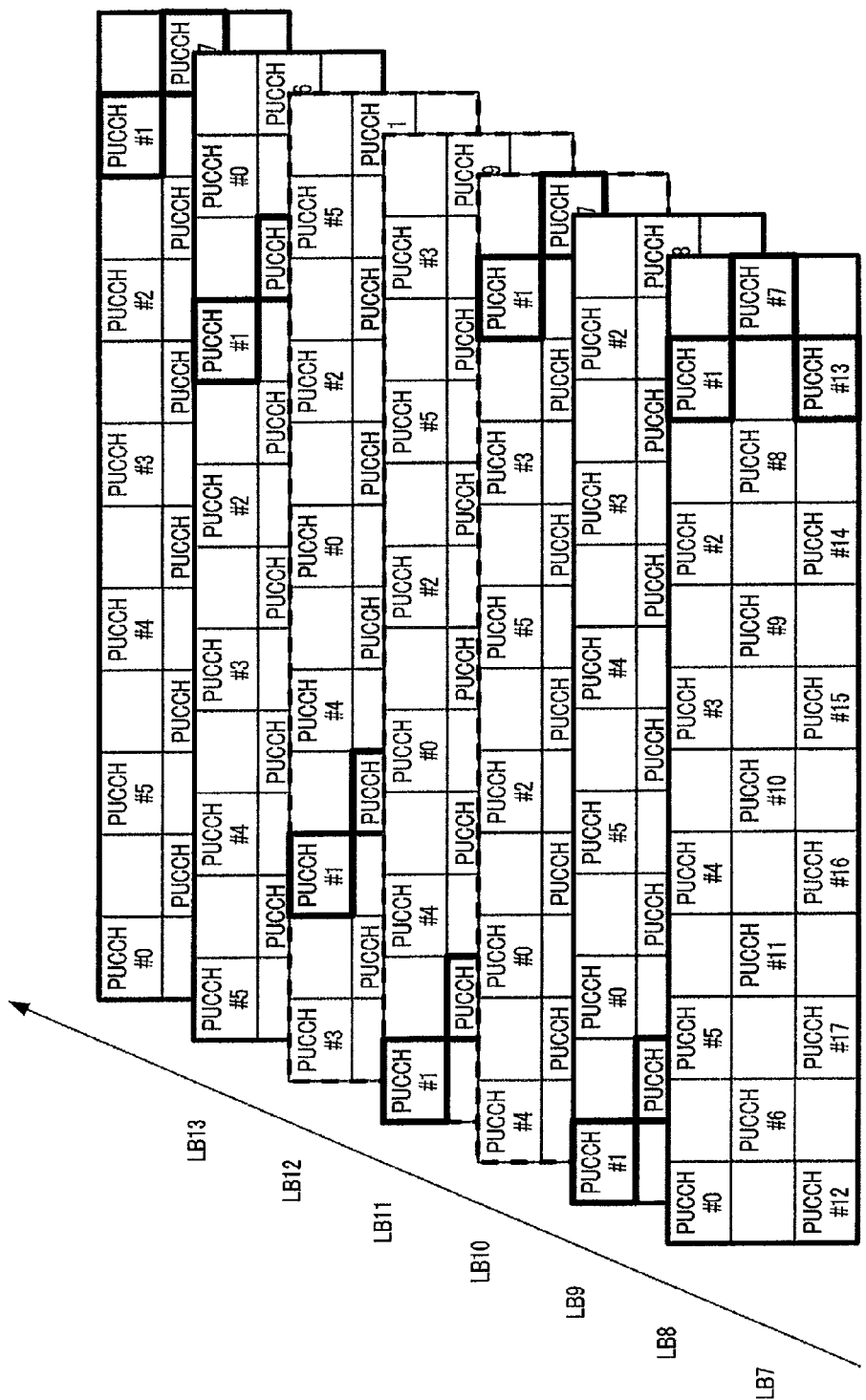
FIG. 10B shows a second layer hopping pattern according to Embodiment 2 of the present invention (slot 1)

With the present embodiment, as shown in FIGS. 10A and 10B, a mobile-station-specific hopping pattern in Embodiment 1 is the same in the multiplication unit of an orthogonal sequence and varies between the multiplication units of orthogonal sequence.

Figure 1:
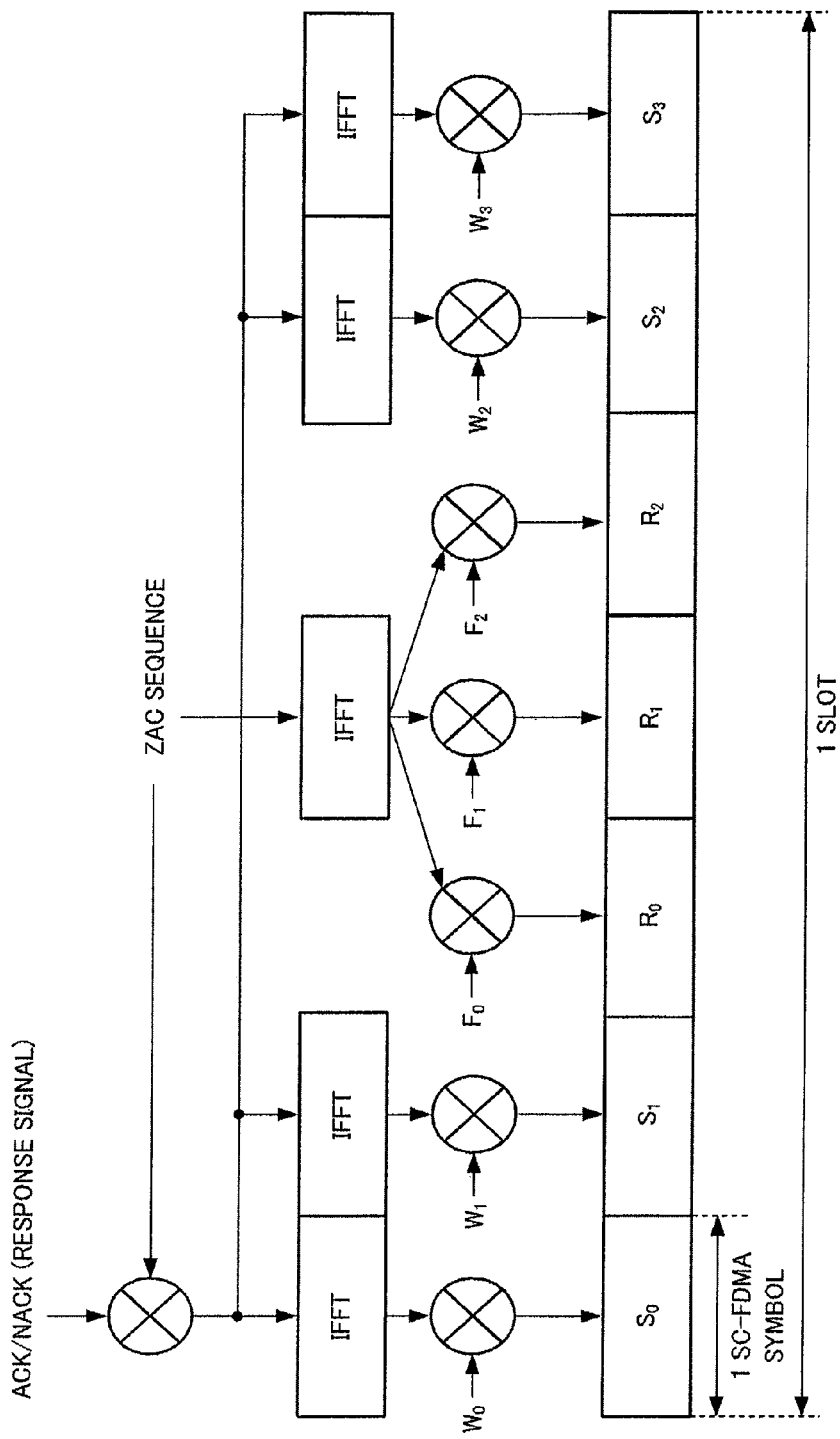
FIG. 1 shows a method for spreading a response signal and reference signal (prior art)

To be more specific, as shown in FIGS. 10A and 10B, a mobile-station-specific hopping pattern is the same in the multiplication unit of [$W_0, W_1, W_2, W_3$] in FIG. 1, that is, the hopping pattern is the same between the unit of LB 0, LB 1, LB 5 and LB 6 in slot 0 and the unit of LB 7, LB 8, LB 12 and LB 13 in slot 1. Also, a mobile-station-specific hopping pattern is the same in the multiplication unit of [$F_0, F_1, F_2$] in FIG. 1, that is, the hopping pattern is the same between the unit of LB 2, LB 3 and LB 4 in slot 0 and the unit of LB 9, LB 10 and LB 11 in slot 1. Further, a mobile-station-specific hopping pattern varies between the multiplication unit of [$W_0, W_1, W_2, W_3$] and the multiplication unit of [$F_0, F_1, F_2$]. Therefore, as shown in FIGS. 10A and 10B, a second layer hopping pattern is represented by four cyclic shift values on a per slot basis, and does not vary but is the same in the multiplication unit of [$W_0, W_1, W_2, W_3$] or in the multiplication unit of [$F_0, F_1, F_2$].

Hopping of the present example is represented by equation 8. That is, the cyclic shift value $CS_{index}(k,i,cell_{id})$ used by the k-th PUCCH in the i-th LB (SC-FDMA symbol) in the cell of the cell index $cell_{id}$, is given by equation 8.

$$CS_{index}(k,i,cell_{id}) = \mod(\text{init}(k) + \text{Hop}_{LB}(i,cell_{id}) + \text{Hop}_{block}(k,l), 12)$$ (Equation 8)

Here, in equation 8, $\text{Hop}_{block}(k,l)$ represents a second layer hopping pattern that is common between a plurality of cells, "l" represents the index of a second layer hopping pattern, and "i" and "l" hold the relationship shown in equation 9.

$$l=0(i=0,1,5,6), l=1(i=2,3,4), l=2(i=7,8,12,13), l=3(i=9,10,11)$$ (Equation 9)

Figure 11A:
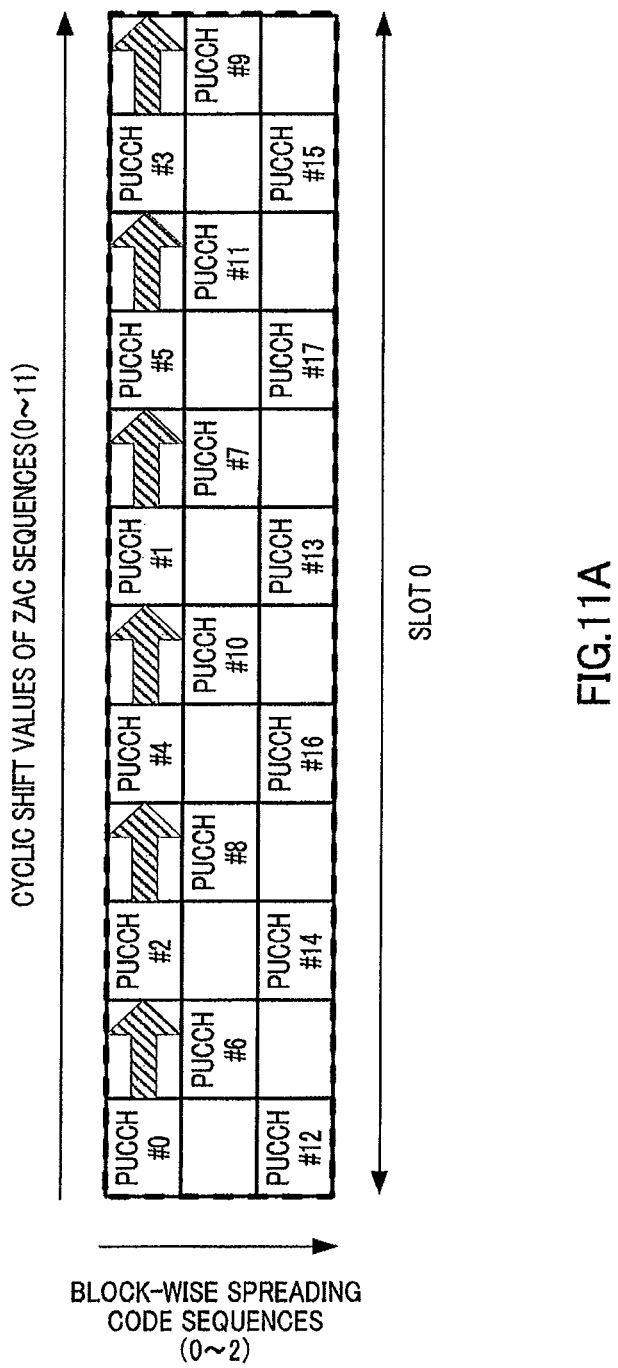
FIG. 11A shows a second layer hopping pattern according to Embodiment 2 of the present invention (slot 0)
Figure 11B:
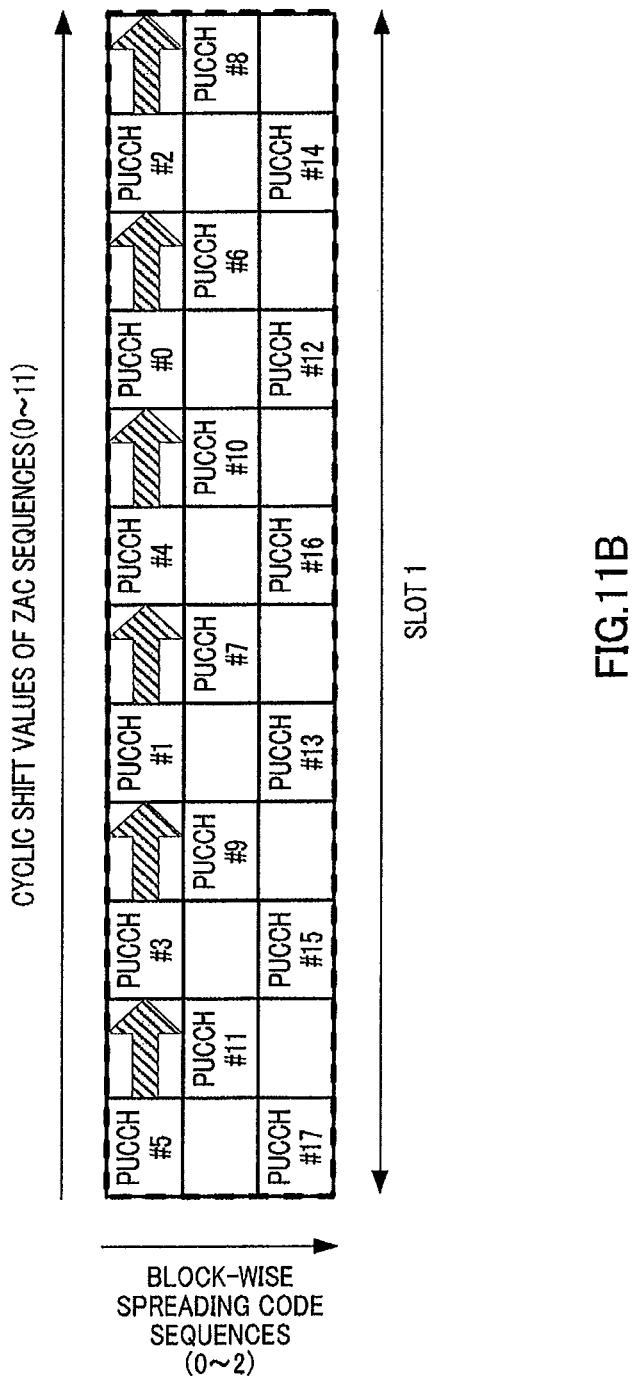
FIG. 11B shows a second layer hopping pattern according to Embodiment 2 of the present invention (slot 1)

Here, FIGS. 11A and 11B show second layer hopping patterns in the units of LB 2, LB 3 and LB 4 in slot 0 and the units of LB 9, LB 10 and LB 11 in slot 1. Also, the second layer hopping patterns in the units of LB 0, LB 1, LB 5 and LB 6 in slot 0 and the units of LB 7, LB 8, LB 12 and LB 13 in slot 1 are the same as in Embodiment 1 (see FIGS. 7A and 7B). Here, referring to FIG. 7A and FIG. 11A, it is understood that PUCCH's front and rear adjacent to all PUCCH's of PUCCH #0 to PUCCH #17 on the cyclic shift axis are different between FIG. 7A and FIG. 11A. For example, while PUCCH #0 is front adjacent to PUCCH #1 and PUCCH #2 is rear adjacent to PUCCH #1 in FIG. 7A, PUCCH #4 is front adjacent to PUCCH #1 and PUCCH #5 is rear adjacent to PUCCH #1 in FIG. 11A. Therefore, it is possible to further randomize intra-cell interference.

Thus, according to the present embodiment, second layer hopping patterns include four cyclic shift values, so that it is possible to increase the number of second layer hopping patterns and further randomize intra-cell interference.

Embodiments of the present invention have been described above.

Also, a PUCCH used for explanation in the above embodiments is the channel for feeding back an ACK or NACK, and, consequently, may be referred to as an "ACK/NACK channel."

Also, it is equally possible to implement the present invention even in the case of feeding back control information other than response signals.

Also, a mobile station may be referred to as a "terminal station," "UE," "MT," "MS" or "STA (STAtion)". Also, a base station may be referred to as "Node B," "BS" or "AP." Also, a subcarrier may be referred to as a "tone." Also, a CP may be referred to as a "GI (Guard Interval)".

Also, the error detecting method is not limited to CRC check.

Also, a method of performing conversion between the frequency domain and the time domain is not limited to IFFT and FFT.

Also, cases have been described above with embodiments where the present invention is applied to mobile stations. However, the present invention is also applicable to a fixed radio communication terminal apparatus in a stationary state and a radio communication relay station apparatus that performs the same operations with a base station as a mobile station. That is, the present invention is applicable to all radio communication apparatuses.

Although a case has been described with the above embodiments as an example where the present invention is implemented with hardware, the present invention can be implemented with software.

Furthermore, each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells in an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2007-257764, filed on Oct. 1, 2007, including the specification, drawings and abstract, is incorporated herein by reference in its entirety.

INDUSTRIAL APPLICABILITY

The present invention is applicable to, for example, mobile communication systems.

The invention claimed is:

1. A mobile apparatus for spreading an ACK, NACK (acknowledgment, negative-acknowledgment) signal or a CQI (channel quality indicator) signal by using a sequence defined with a cyclic shift amount having a cyclic shift index, which is one of a total of 12 cyclically continuous cyclic shift indexes, and transmitting the ACK, NACK signal or the CQI signal by using a physical resource that supports a mix of the ACK, NACK signal and the CQI signal, comprising:
   (a) for transmitting the ACK, NACK signal,
   a spreading section that spreads the ACK, NACK signal by using an orthogonal sequence having a sequence index corresponding to a PUCCH (physical uplink control channel) number allocated to the mobile apparatus and by using the sequence defined with the cyclic shift amount having the cyclic shift index corresponding to the PUCCH number;
   a transmitting section that transmits the spread ACK, NACK signal; and a changing section which changes the cyclic shift amount having the cyclic shift index corresponding to the PUCCH number between symbols, so that a difference in the cyclic shift amount between the symbols is common in a cell, and which changes the cyclic shift amount having the cyclic shift index corresponding to the PUCCH number between slots, so that a difference in the cyclic shift amount between the slots differs amongst PUCCH numbers, wherein the changing section changes the cyclic shift amount having the cyclic shift index corresponding to the PUCCH number between the slots so that the cyclic shift index corresponding to the PUCCH number in each of the slots is one of N number of cyclically continuous cyclic shift indexes where N is an integer, and wherein cyclic shift amounts of the N number of cyclically continuous cyclic shift indexes differ amongst symbols; and (b) for transmitting the CQI signal, the spreading section spreads the CQI signal by using the sequence defined with the cyclic shift amount having the cyclic shift index, which is one of (12−N) number of cyclically continuous cyclic shift indexes that result from excluding the N number of cyclically continuous cyclic shift indexes from the total of 12 cyclically continuous cyclic shift indexes, and the transmitting section transmits the spread CQI signal.

2. The mobile apparatus according to claim 1, wherein the N is smaller than 12.

3. The mobile apparatus according to claim 1, wherein the changing section changes the sequence index corresponding to the PUCCH number between slots, so that a difference in the sequence index between the slots differs amongst PUCCH numbers.

4. A mobile apparatus for spreading an ACK, NACK (acknowledgment, negative-acknowledgment) signal or a CQI (channel quality indicator) signal by using a sequence defined with a cyclic shift amount having a cyclic shift index, which is one of a total of 12 cyclically continuous cyclic shift indexes, and transmitting the ACK, NACK signal or the CQI signal by using a physical resource that supports a mix of the ACK, NACK signal and the CQI signal, comprising:

(a) for transmitting the ACK, NACK signal, a determining section that determines a first cyclic shift index corresponding to a sum of a first term value calculated based on a symbol index and a value common in a cell and a second term value calculated based on a slot index and a PUCCH (physical uplink control channel) number allocated to the mobile apparatus;

a spreading section that spreads the ACK, NACK signal using the cyclic shift amount having the determined first cyclic shift index; and a transmitting section that transmits the spread ACK, NACK signal, wherein the second term value, regardless of the slot index and the PUCCH number based on which it is calculated, is one of N number of continuous values where N is an integer; and (b) for transmitting the CQI signal, the determining section determines a second cyclic shift index, which is one of (12−N) number of cyclically continuous cyclic shift indexes that result from excluding the N number of cyclically continuous cyclic shift indexes from the 12 cyclic shift indexes, the N number of cyclically continuous cyclic shift indexes corresponding to respective sums of the first term value and the N values, the spreading section spreads the CQI signal using a sequence defined with the cyclic shift amount having the determined second cyclic shift index, and the transmitting section transmits the spread CQI signal.

5. The mobile apparatus according to claim 4, wherein the N is smaller than 12.

6. The mobile apparatus according to claim 4, wherein the spreading section spreads the ACK, NACK signal using an orthogonal sequence having a sequence index corresponding to the PUCCH number allocated to the mobile apparatus, the mobile apparatus further comprising:

a changing section that changes the sequence index corresponding to the PUCCH number between slots, so that a difference in the sequence index between the slots differs amongst PUCCH numbers.

7. A transmitting method for spreading an ACK, NACK (acknowledgment, negative-acknowledgment) signal or a CQI (channel quality indicator) signal by using a sequence defined with a cyclic shift amount having a cyclic shift index, which is one of a total of 12 cyclically continuous cyclic shift indexes, and transmitting, from a mobile apparatus, the ACK, NACK signal or the CQI signal by using a physical resource that supports a mix of the ACK, NACK signal and the CQI signal, the method comprising:

(a) in a case of transmitting the ACK, NACK signal, spreading the ACK, NACK signal by using an orthogonal sequence having a sequence index corresponding to a PUCCH (physical uplink control channel) number allocated to the mobile apparatus and by using the sequence defined with the cyclic shift amount having the cyclic shift index corresponding to the PUCCH number;

transmitting the spread ACK, NACK signal; and changing the cyclic shift amount having the cyclic shift index corresponding to the PUCCH number between symbols, so that a difference in the cyclic shift amount between the symbols is common in a cell, and changing the cyclic shift amount having the cyclic shift index corresponding to the PUCCH number between slots, so that a difference in the cyclic shift amount between the slots differs amongst PUCCH numbers, wherein the changing between slots is performed so that the cyclic shift index corresponding to the PUCCH number in each of the slots is one of N number of cyclically continuous cyclic shift indexes where N is an integer, and wherein cyclic shift amounts of the N number of cyclically continuous cyclic shift indexes differ amongst symbols; and (b) in a case of transmitting the CQI signal, spreading the CQI signal by using the sequence defined with the cyclic shift amount having the cyclic shift index, which is one of (12−N) number of cyclically continuous cyclic shift indexes that result from excluding the N number of cyclically continuous cyclic shift indexes from the total of 12 cyclically continuous cyclic shift indexes; and transmitting the spread CQI signal.

8. The transmitting method according to claim 7 wherein the N is smaller than 12.

9. The transmitting method according to claim 7, wherein the changing is performed to change the sequence index corresponding to the PUCCH number between slots, so that a difference in the sequence index between the slots differs amongst PUCCH numbers.

10. A transmitting method for spreading an ACK, NACK (acknowledgment, negative-acknowledgment) signal or a CQI (channel quality indicator) signal by using a sequence defined with a cyclic shift amount having a cyclic shift index, which is one of a total of 12 cyclically continuous cyclic shift indexes, and transmitting, from a mobile apparatus, the ACK, NACK signal or the CQI signal by using a physical resource that supports a mix of the ACK, NACK signal and the CQI signal, the method comprising:

(a) in a case of transmitting the ACK, NACK signal, determining a first cyclic shift index corresponding to a sum of a first term value calculated based on a symbol index and a value common in a cell and a second term value calculated based on a slot index and a PUCCH (physical uplink control channel) number allocated to the mobile apparatus;

spreading the ACK, NACK signal using the cyclic shift amount having the determined first cyclic shift index; and transmitting the spread ACK, NACK signal, wherein the second term value, regardless of the slot index and the PUCCH number based on which it is calculated, is one of N number of continuous values where N is an integer;

(b) in a case of transmitting the CQI signal, determining a second cyclic shift index, which is one of (12−N) number of cyclically continuous cyclic shift indexes that result from excluding the N number of cyclically continuous cyclic shift indexes from the total of 12 cyclic shift indexes, the N number of cyclically continuous cyclic shift indexes corresponding to respective sums of the first term value and the N values;

spreading the CQI signal using a sequence defined with the cyclic shift amount having the determined second cyclic shift index; and transmitting the spread CQI signal.

11. The transmitting method according to claim 10 wherein the N is smaller than 12.

12. The transmitting method according to claim 10, further comprising:

spreading the ACK, NACK signal using an orthogonal sequence having a sequence index corresponding to the PUCCH number allocated to the mobile apparatus; and changing the sequence index corresponding to the PUCCH number between slots, so that a difference in the sequence index between the slots differs amongst PUCCH numbers.

* * * * *

UNITED STATES PATENT AND TRADEMARK OFFICE
CERTIFICATE OF CORRECTION

PATENT NO. : 8,532,160 B2  
APPLICATION NO. : 13/651014  
DATED : September 10, 2013  
INVENTOR(S) : Seigo Nakao et al.

Page 1 of 1

It is certified that error appears in the above-identified patent and that said Letters Patent is hereby corrected as shown below:

On the Title Page Item [71]:

"Seigo Nakao, Kanagawa (JP); Daichi Imamura, Kanagawa (JP); Katsuhiko Hiramatsu, Leuven (BE)" should read, --Panasonic Corporation, Osaka (JP)--.

Signed and Sealed this  
Twenty-fifth Day of March, 2014

Michelle K. Lee  
*Deputy Director of the United States Patent and Trademark Office*